United States Patent [19]
Yanagisawa

[11] Patent Number: 5,184,222
[45] Date of Patent: Feb. 2, 1993

[54] WIPE GENERATOR HAVING START POSITION AND WIDTH CONTROLLER

[75] Inventor: Ryogo Yanagisawa, Osaka, Japan

[73] Assignee: Matsushita Electric Industrial Co., Ltd., Osaka, Japan

[21] Appl. No.: 636,803

[22] Filed: Jan. 2, 1991

[30] Foreign Application Priority Data

Jan. 19, 1990 [JP] Japan .................................. 2-11294
Apr. 20, 1990 [JP] Japan ................................ 2-106190

[51] Int. Cl.$^5$ ........................................... H04N 5/262
[52] U.S. Cl. ................................................ 358/183
[58] Field of Search ....................... 358/183, 160, 22

[56] References Cited

U.S. PATENT DOCUMENTS

| | | |
|---|---|---|
| 3,757,041 | 9/1973 | Thorpe et al. |
| 4,520,398 | 5/1985 | Takahashi |
| 4,591,913 | 5/1986 | Pohl |
| 4,809,072 | 2/1989 | Pohl ................................ 358/183 |
| 4,831,447 | 5/1989 | Lake, Jr. |
| 4,954,898 | 9/1990 | Nakata ............................. 358/183 |
| 4,974,083 | 11/1990 | Bloomfield et al. ............... 358/160 |

FOREIGN PATENT DOCUMENTS

1525838 4/1978 United Kingdom .

OTHER PUBLICATIONS

Television Technics & Electronics; '89/vol. 37; pp. 15–21.

Primary Examiner—James J. Groody
Assistant Examiner—Mark R. Powell
Attorney, Agent, or Firm—Lowe, Price, LeBlanc & Becker

[57] ABSTRACT

A wipe waveform signal generating apparatus includes a wipe width generator generating a wipe width. A wipe waveform extended width holding device outputs a horizontal extended width and a vertical extended width. A wipe waveform calculator receives the wipe width, the horizontal extended width, and the vertical extended width, and outputs a rectangular-area horizontal width, a rectangular-area vertical width, a rectangular-area horizontal starting position, and a rectangular-area vertical starting position. A change signal generator receives the rectangular-area horizontal width, the rectangular-area vertical width, the rectangular-area horizontal starting position, and the rectangular-area vertical starting position, and outputs a wipe waveform signal.

7 Claims, 16 Drawing Sheets

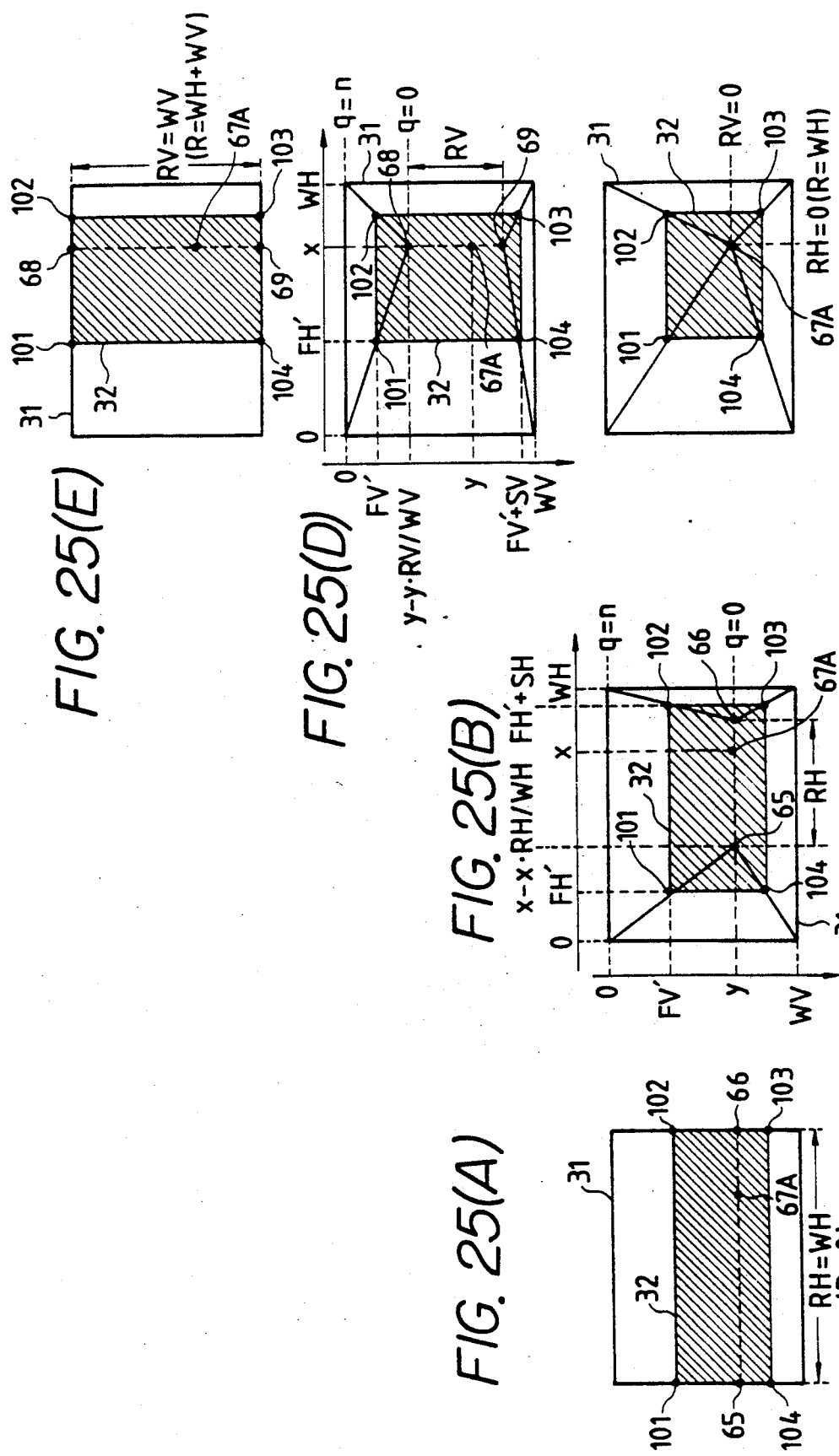

WIPE GENERATOR HAVING START POSITION AND WIDTH CONTROLLER

BACKGROUND OF THE INVENTION

This invention relates to a wipe waveform signal generator in a wipe section of a video signal processing apparatus such as a video signal mixing apparatus or a video signal editing apparatus.

Some video signal mixing apparatuses include a time base corrector (TBC) which enables the mixing of two video signals out of synchronism with each other. In general, a TBC is expensive.

There are advanced video signal mixing apparatuses which dispense with a TBC. The advanced video signal mixing apparatuses include a wipe section for executing a wipe function. The wipe section has a wipe waveform signal generator.

SUMMARY OF THE INVENTION

It is an object of this invention to provide an improved wipe waveform signal generator.

In a first aspect of this invention a wipe waveform signal generating apparatus comprising a wipe width generator generating a wipe width and a wipe waveform extended width holding device outputting a horizontal extended width and a vertical extended width. A wipe waveform calculator receives the wipe width, the horizontal extended width, and the vertical extended width, and calculate therefrom a rectangular-area horizontal width, a rectangular-area vertical width, a rectangular-area horizontal starting position, and a rectangular-area vertical starting position. A change signal generator receives the calculated rectangular-area horizontal width, the rectangular-area vertical width, the rectangular-area horizontal starting position, and the rectangular-area vertical starting position. Based upon these valves a wipe waveform signal is output.

In a second aspect of this invention a wipe waveform signal generating apparatus comprises first means for generating a signal representing a wipe width "q"; second means for generating a signal representing a horizontal extended width RH; third means for generating a signal representing a vertical extended width RV; fourth means responsive to the signal generated by the first means for calculating a value which is equal to "n−q" and for outputting a signal representing the calculated value "n−q"; fifth means responsive to the signal generated by the first means and the signal generated by the second means for calculating a rectangular-area horizontal width SH which is given as:

$$SH = (WH - RH) \cdot q/n + RH$$

where WH denotes a horizontal width of a screen. The fifth means is operative for outputting a signal representing the calculated rectangular-area horizontal width SH. Also included is sixth means responsive to the signal generated by the first means and the signal generated by the third means for calculating a rectangular-area vertical width SV which is given as:

$$SV = (WV - RV) \cdot q/n + RV$$

where WV denotes a vertical height of the screen. The sixth means being operative for outputting a signal representing the calculated rectangular-area vertical width SV. Also included is seventh means responsive to the signal generated by the fourth means and the signal generated by the second means for calculating a rectangular-area horizontal starting position FH which is given as:

$$FH = (x - x \cdot RH/WH) \cdot (n-q)/n + FH0$$

where "x" denotes a horizontal width between a left-hand edge of the screen and a center of a wipe area, and FH0 denotes a first predetermined value. The seventh means is operative for outputting a signal representing the calculated rectangular-area horizontal starting position FH. The apparatus further comprises eighth means responsive to the signal generated by the fourth means and the signal generated by the third means for calculating a rectangular-area vertical starting position FV which is given as:

$$FV = (y - y \cdot RV/WV) \cdot (n-q)/n + FV0$$

where "y" denotes a vertical width between an upper edge of the screen and the center of the wipe area, and FV0 denotes a second predetermined value. The eighth means is operative for outputting a signal representing the calculated rectangular-area vertical starting position FV. Ninth means are used for generating a wipe waveform signal on the basis of the output signal from the fifth means, the output signal from the sixth means, the output signal from the seventh means, and the output signal from the eighth means.

A third aspect of this invention includes a wipe apparatus for use with a video system comprising means for determining a wipe start position within the screen and means for enabling the wipe start position to expand into a rectangular wipe area within the screen, and for enabling the wipe area to expand into agreement with the screen to execute a wipe process. Also included are means for indicating a first image on the wipe area of the screen in response to a first video signal; means for indicating a second image on a part of the screen except the wipe area in response to a second video signal; and, means for enabling four vertexes of the wipe area to reach respective four corners of the screen at a same moment at an end of the expansion of the wipe area into agreement with the screen. This operation will take place even in cases where a center of the wipe start position is offset from a center of the screen.

BRIEF DESCRIPTION OF THE DRAWINGS

FIG. 25 is a diagram showing varying wipe areas in the screen which are realized by the wipe waveform signal generator of FIG. 20.

DESCRIPTION OF THE PRIOR ART

Prior to the detailed description of this invention, a prior art wipe waveform signal generator will be described for a better understanding of this invention.

Figure 1:
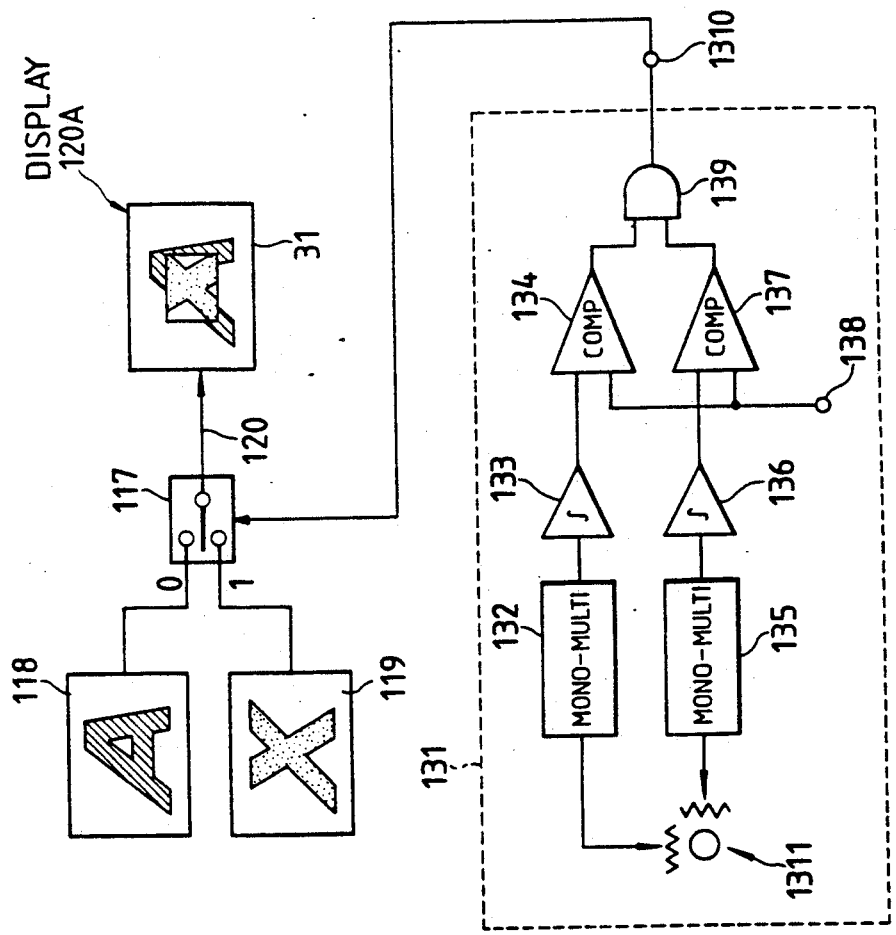
FIG. 1 is a block diagram of a prior art wipe waveform signal generator and related sections of a prior art digital audio/video mixer and a prior art video system.

Japanese magazine "TELEVISION TECHNICS & ELECTRONICS", VOL. 37 Jul. 1989, pages 15-21, reports a digital audio/video mixer which includes a wipe waveform signal generator. FIG. 1 shows the wipe waveform signal generator and a related section of this prior art digital audio/video mixer.

In FIG. 1, the prior art wipe waveform signal generator is denoted by the reference numeral 131. The prior art wipe waveform signal generator 131 includes monostable multivibrators 132 and 135, integrators 133 and 136, comparators 134 and 137, a dc voltage input terminal 138, an AND circuit 139, a wipe waveform signal output terminal 1310, and a positioner (a positioning device) 1311.

Figure 2:
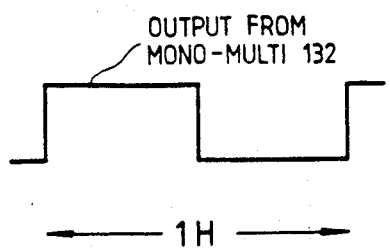
FIGS. 2-5 are diagrams showing the waveforms of various signals in the prior art wipe waveform signal generator of FIG. 1.
Figure 3:
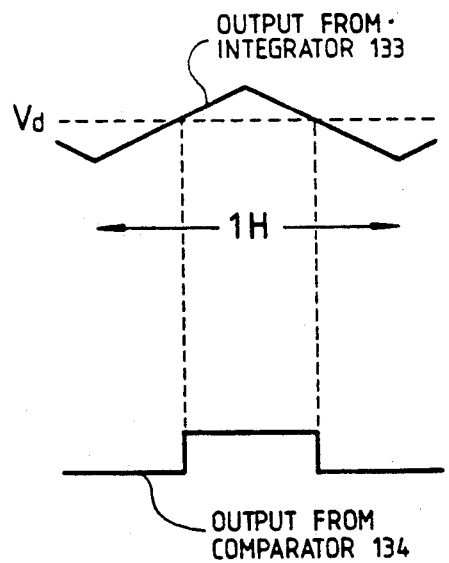

The monostable multivibrator 132 outputs a pulse signal having a 1-H period and a 50% duty cycle, where the letter "H" denotes a horizontal scanning period. The waveform of the output signal from the monostable multivibrator 132 is shown in FIG. 2. The output signal from the monostable multivibrator 132 is integrated by the integrator 133 into a triangular waveform signal whose waveform is shown in FIG. 3. The triangular waveform signal is outputted from the integrator 133 to the comparator 134. A dc voltage Vd is fed to the comparator 134 via the input terminal 138. The comparator 134 compares the triangular waveform signal and the dc voltage Vd, generating a horizontal wipe waveform signal which is binary as shown in FIG. 3.

Figure 4:
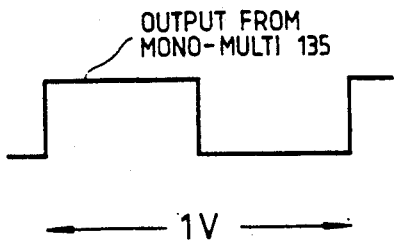
Figure 5:
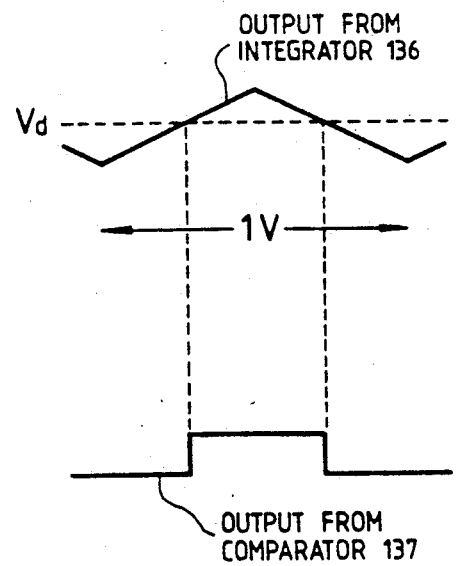

The monostable multivibrator 135 outputs a pulse signal having a 1-V period and a 50% duty cycle, where the letter "V" denotes a vertical scanning period. The waveform of the output signal from the monostable multivibrator 135 is shown in FIG. 4. The output signal from the monostable multivibrator 135 is integrated by the integrator 136 into a triangular waveform signal whose waveform is shown in FIG. 5. The triangular waveform signal is outputted from the integrator 136 to the comparator 137. The dc voltage Vd is fed to the comparator 137 via the input terminal 138. The comparator 137 compares the triangular waveform signal and the dc voltage Vd, generating a vertical wipe waveform signal which is binary as shown in FIG. 5.

The horizontal wipe waveform signal and the vertical wipe waveform signal are combined by the AND circuit 139 into a final wipe waveform signal which is transmitted via the output terminal 1310. The final wipe waveform signal is binary, being changeable between "0" and "1".

The final wipe waveform signal is fed from the wipe waveform signal generator 131 to the control terminal of an analog switch 117. The analog switch 117 will be referred to as the video switch 117 hereinafter. The video switch 117 selects one of a first video signal 118 and a second video signal 119 in response to the final wipe waveform signal. Specifically, when the final wipe waveform signal is "0", the first video signal 118 is selected. When the final wipe waveform signal is "1", the second video signal 119 is selected. Thus, the video switch 117 outputs a composite video signal 120 formed by the selected video signals 118 and 119. The composite video signal 120 is fed to a display device 120A having a screen 31. Display information represented by the composite video signal 120 is indicated on the screen 31. In more detail, during periods corresponding to a rectangular window area (a rectangular wipe area) within a frame, the second video signal 119 is selected. During other periods, the first video signal 118 is selected. Thus, the second video signal 119 replaces the first video signal 118 in the rectangular wipe area while the first video signal 118 remains in the other area.

The dimensions of the wipe area are determined by the final wipe waveform signal. Specifically, the horizontal length and the vertical length of the wipe area are determined by the horizontal wipe waveform signal and the vertical wipe waveform signal respectively which compose the final wipe waveform signal. As the dc voltage Vd fed via the input terminal 138 varies, the horizontal wipe waveform signal and the vertical wipe waveform signal change so that the dimensions of the wipe area vary. Thus, wipe is realized by varying the dc voltage Vd.

The monostable multivibrators 132 and 135 are connected to the positioner 1311. The center of the wipe area is shifted by operating the positioner 1311.

Figure 6:
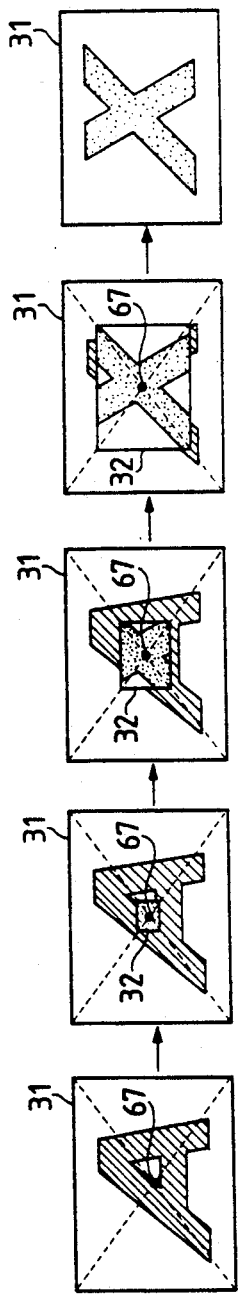
FIGS. 6 and 7 are diagrams showing varying conditions of reproduced images on a screen which occur during wipe executed by the prior art wipe waveform signal generator of FIG. 1.

FIG. 6 shows pictures which are indicated on a rectangular screen 31 during wipe in the prior art apparatus of FIG. 1 under conditions where the center 67 of a rectangular wipe area 32 coincides with the center of the screen 31. As shown in FIG. 6, during the wipe, the wipe area 32 remains similar in shape to the screen 31 while the size of the wipe area 32 varies.

Figure 7:
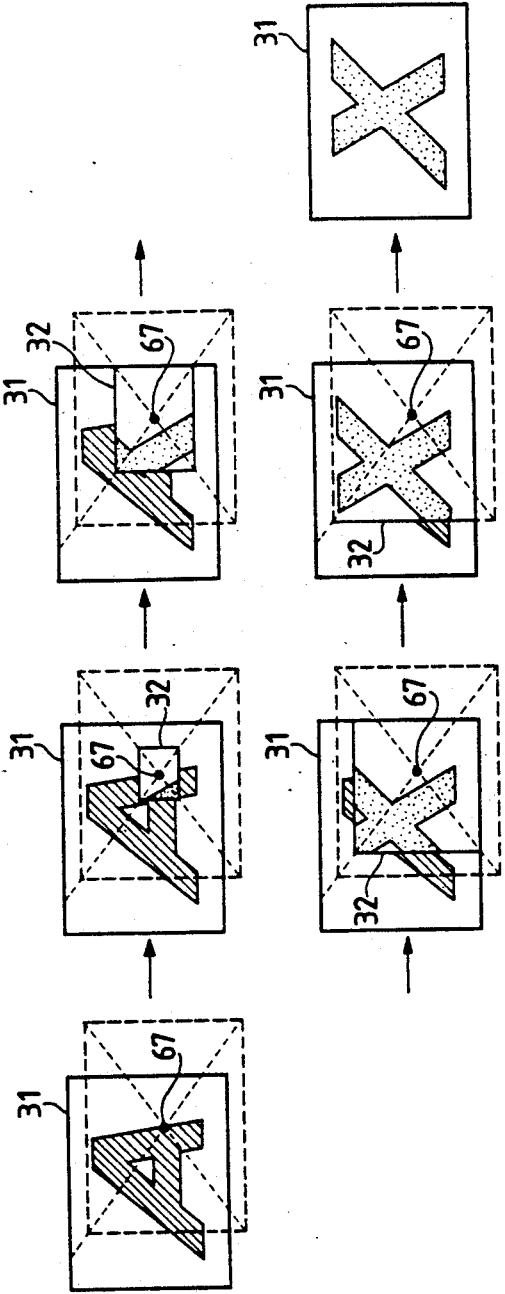

FIG. 7 shows pictures which are indicated on a rectangular screen 31 during wipe in the prior art apparatus of FIG. 1 under conditions where the center 67 of a rectangular wipe area 32 is rightwardly and downwardly offset from the center of the screen 31. As shown in FIG. 7, during the wipe, the right-hand edge of the wipe area 32 reaches the right-hand edge of the screen 31 before the other edges of the wipe area 32 reach the corresponding edges of the screen 31. In addition, after the right-hand edge of the wipe area 32 reaches the right-hand edge of the screen 31, the wipe area 32 within the screen 31 becomes out of similarity in shape to the screen 31.

DESCRIPTION OF THE FIRST PREFERRED EMBODIMENT

Figure 8:
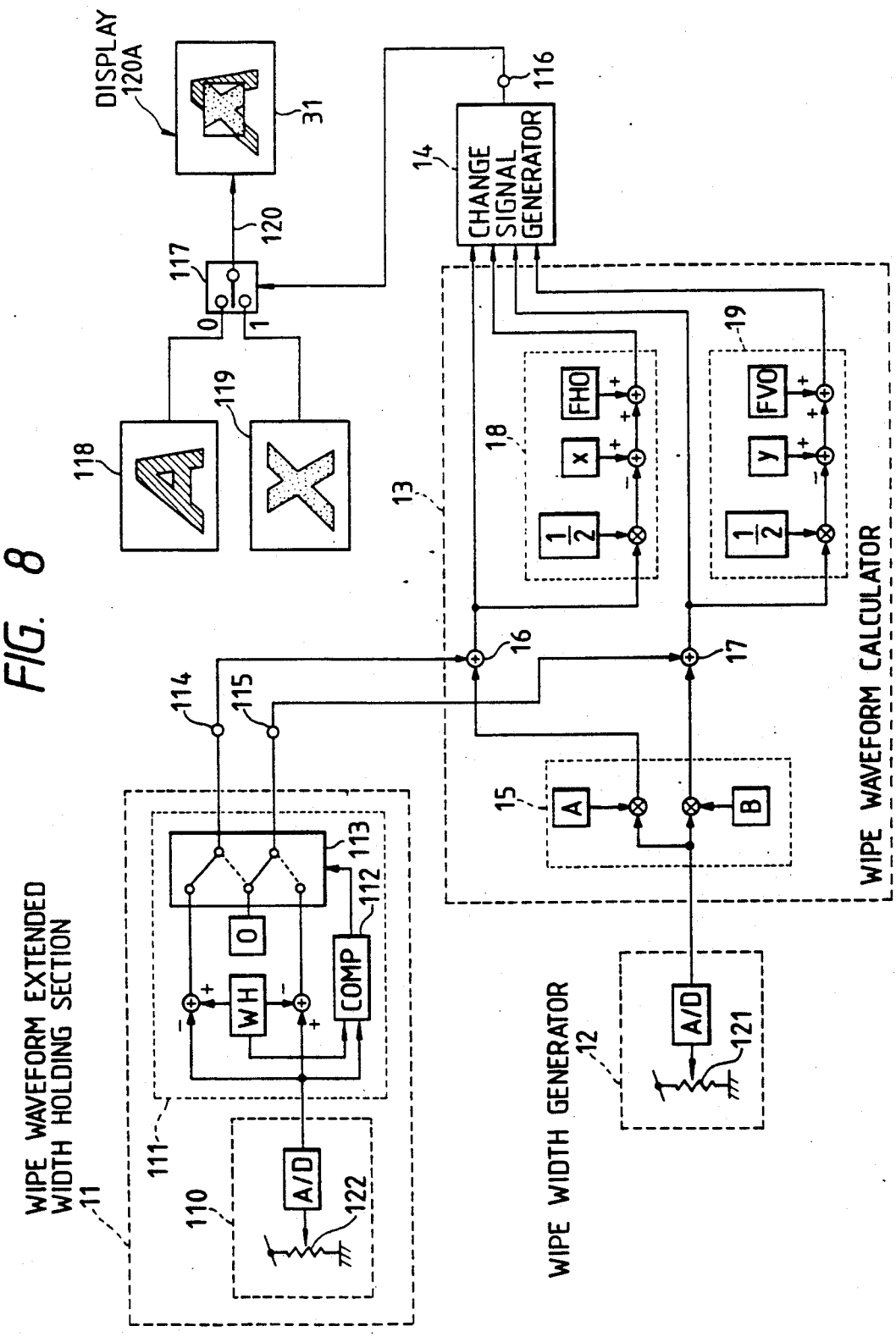
FIG. 8 is a block diagram of a wipe waveform signal generator according to a first embodiment of this invention and related sections of a video mixer and a video system.

With reference to FIG. 8, a wipe waveform extended width holding section 11 outputs signals representing extended widths of a wipe area in a horizontal direction and a vertical direction (which are referred to as a horizontal extended width and a vertical extended width respectively). The output signals from the wipe waveform extended width holding section 11 are fed to a wipe waveform calculator 13 via terminals 114 and 115.

A wipe width generator 12 outputs a signal representative of a wipe width to the wipe waveform calculator 13.

The wipe waveform calculator 13 decides the size and the position of a wipe area on the basis of the horizontal extended width, the vertical extended width, and the wipe width represented by the output signals from the devices 11 and 12. The wipe waveform calculator 13 outputs signals representative of the decided size and the decided position of the wipe area to a change signal generator 14.

The change signal generator 14 generates a wipe waveform signal on the basis of the output signals of the wipe waveform calculator 13. The wipe waveform signal is binary, being changeable between "0" and "1". The wipe waveform signal is fed from the change signal generator 14 to the control terminal of an analog switch 117 via a terminal 116.

The analog switch 117 will be referred to as the video switch 117 hereinafter. The video switch 117 selects one of a first video signal 118 and a second video signal 119 in response to the wipe waveform signal. Specifically, when the wipe waveform signal is "0", the first video signal 118 is selected. When the wipe waveform signal is "1", the second video signal 119 is selected. Thus, the video switch 117 outputs a composite video signal 120 formed by the selected video signals 118 and 119. The composite video signal 120 is fed to a display device 120A having a screen 31. Display information represented by the composite video signal 120 is indicated on the screen 31. In more detail, during periods corresponding to a rectangular window area (a rectangular wipe area) within a frame, the second video signal 119 is selected. During other periods, the first video signal 118 is selected. Thus, the second video signal 119 replaces the first video signal 118 in the rectangular wipe area while the first video signal 118 remains in the other area.

The devices 11-14 will be further described. The wipe waveform extended width holding section 11 outputs the signal representative of the horizontal extended width RH to the wipe waveform calculator 13 via the terminal 114. The horizontal extended width RH is chosen as "0≦RH≦WH" where WH denotes the horizontal dimension of the screen 31. In addition, the wipe waveform extended width holding section 11 outputs the signal representative of the vertical extended width RV to the wipe waveform calculator 13 via the terminal 115. The vertical extended width RV is chosen as "0≦RV≦WV" where WV denotes the vertical dimension of the screen 31.

The wipe width generator 12 includes a combination of a constant voltage source and a variable resistor 121, generating a signal whose voltage depends on the position of a control shaft of the variable resistor 121. The generated voltage signal is converted by an A/D converter within the wipe width generator 12 into a corresponding digital signal, which is outputted from the wipe width generator 12 to the wipe waveform calculator 13 as a signal representing a value "p" determining the size of a wipe area.

The wipe waveform calculator 13 includes calculating circuits 15, 18, and 19, and adders 16 and 17. The calculating circuit 15 has multipliers which multiply the value "p" by predetermined constants A and B, obtaining a horizontal wipe width "a" and a vertical wipe width "b" which are expressed as follows.

$$a = p \cdot A$$

$$b = p \cdot B$$

The horizontal wipe width "a" is variable in a predetermined range as "0≦a≦WH". Also, the vertical wipe width "b" is variable in a predetermined range as "0≦b≦WV". The adder 16 adds the horizontal wipe width "a" and the horizontal extended width RH, and obtains a rectangular-area horizontal width SH which is expressed as follows.

$$SH = a + RH \qquad (1)$$

The calculating circuit 18 has a multiplier (serving as a divider), a subtracter, and an adder, and decides a rectangular-area horizontal starting position FH on the basis of the rectangular-area horizontal width SH by executing the following calculation.

$$\begin{aligned} FH &= x - (a + RH)/2 + FH0 \\ &= FH' + FH0 \\ FH' &= x - (a + RH)/2 \end{aligned} \qquad (2)$$

where "x" denotes the horizontal width between the left-hand edge of the screen 31 and the center of a rectangular wipe area; FH0 denotes the horizontal width between the spatial position corresponding to the time position of a horizontal sync pulse and the left-hand edge of the screen; and FH' denotes the horizontal width between the left-hand edge of the screen and the left-hand edge of the rectangular wipe area.

Similar calculations are made in respect of the vertical direction as indicated hereinafter. The adder 17 adds the vertical wipe width "b" and the vertical extended width RV, and obtains a rectangular-area vertical width SV which is expressed as follows.

$$SV = b + RV \qquad (3)$$

The calculating circuit 19 has a multiplier (serving as a divider), a subtracter, and an adder, and decides a rectangular-area vertical starting position FV on the basis of the rectangular-area vertical width SV by executing the following calculation.

$$\begin{aligned} FV &= y - (b + RV)/2 + FV0 \\ &= FV' + FV0 \\ FV' &= y - (b + RV)/2 \end{aligned} \qquad (4)$$

where "y" denotes the vertical width between the upper edge of the screen 31 and the center of the rectangular wipe area; FV0 denotes the vertical width between the spatial position corresponding to the time position of a vertical sync pulse and the upper edge of the screen; and FV' denotes the vertical width between the upper edge of the screen and the upper edge of the rectangular wipe area.

Signals representing the rectangular-area horizontal width SH, the rectangular-area horizontal starting position FH, the rectangular-area vertical width SV, and the rectangular-area vertical starting position FV are outputted from the wipe waveform calculator 13 to the change signal generator 14. It should be noted that the wipe waveform calculator 13 can be a microcomputer.

The change signal generator 14 generates a wipe waveform signal on the basis of the output signals from the wipe waveform calculator 13 which represent the rectangular-area horizontal width SH, the rectangular-area horizontal starting position FH, the rectangular-area vertical width SV, and the rectangular-area vertical starting position FV. The wipe waveform signal is transmitted from the change signal generator 14 to the video switch 117 via the terminal 116. The wipe waveform signal agrees with a logical "AND" between a horizontal wipe waveform signal and a vertical wipe waveform signal which are generated within the change signal generator 14.

Figure 9:
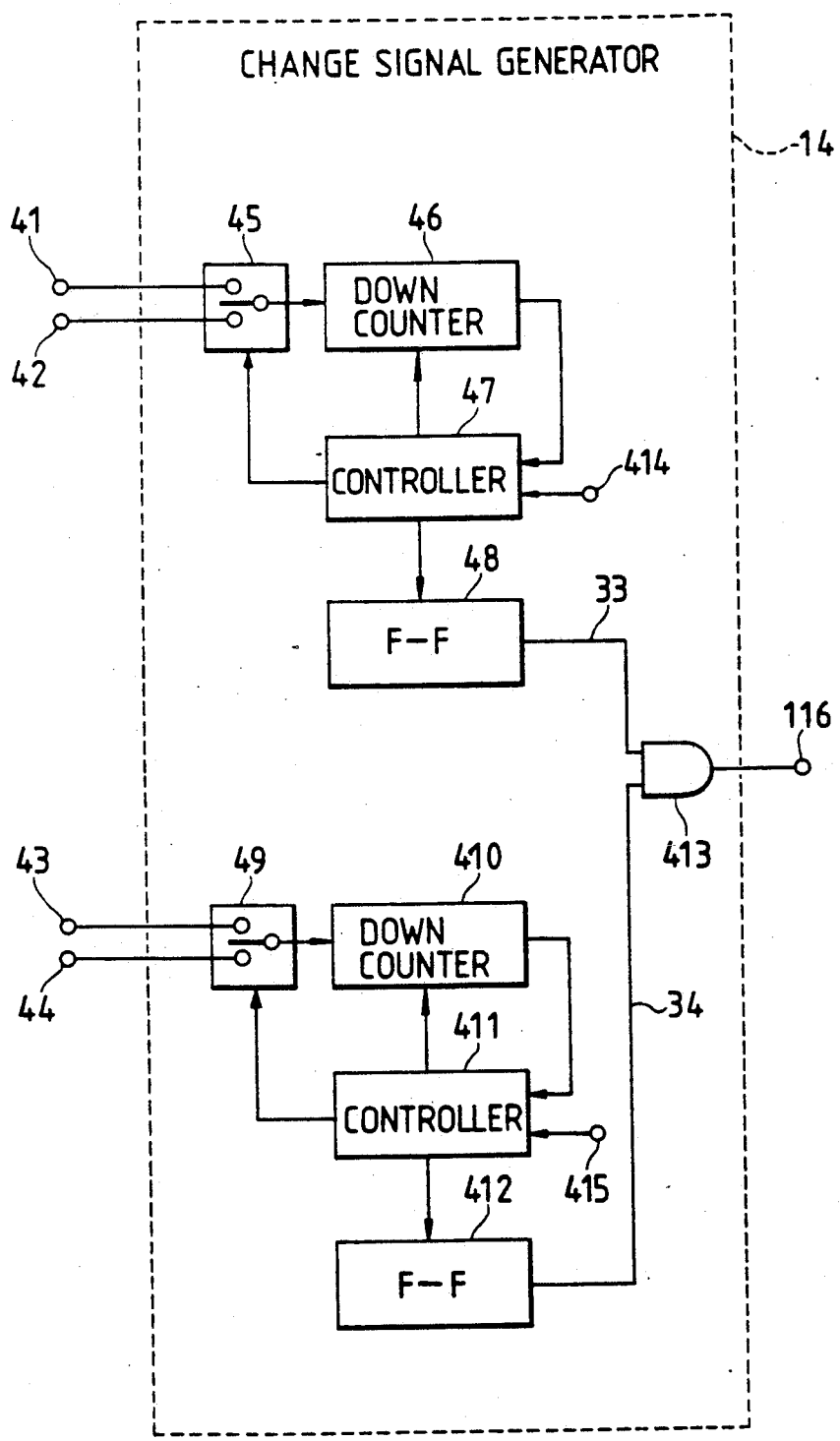
FIG. 9 is a block diagram of the change signal generator of FIG. 8.

As shown in FIG. 9, the change signal generator 14 includes a selector 45, a down counter 46, a controller 47, and a flip-flop 48. The selector 45 receives the signals representative of the rectangular-area horizontal width SH and the rectangular-area horizontal starting position FH via terminals 41 and 42 respectively. The selector 45 selects one of the SH signal and the FH signal in response to a control signal fed from the controller 47, and transmits the selected signal to the down counter 46. Specifically, the controller 47 changes the selector 45 in synchronism with a horizontal sync pulse fed from a terminal 414, so that the FH signal is selected by the selector 45. In addition, the controller 47 controls the down counter 46 so that the down counter 46 is loaded with the FH signal. At the same time, the controller 47 outputs a signal to the flip-flop 48 which enables the flip-flop 48 to output a "0" signal. Then, the down counter 46 counts down from the number FH to 0 at a predetermined period. When the count number reaches 0, the down counter 46 outputs a first carry signal to the controller 47. The controller 47 changes the selector 45 in response to the first carry signal, so that the SH signal is selected by the selector 45. In addition, the controller 47 controls the down counter 46 so that the down counter 46 is loaded with the SH signal. At the same time, the controller 47 outputs a signal to the flip-flop 48 which enables the output signal from the flip-flop 48 to change to "1". Then, the down counter 46 counts down from the number SH to 0 at the predetermined period. When the count number reaches 0, the down counter 46 outputs a second carry signal to the controller 47. The controller 47 outputs a signal to the flip-flop 48 in response to the second carry signal, returning the output signal from the flip-flop 48 to "0". Such operations are periodically reiterated. The output signal from the flip-flop 48 is a horizontal wipe waveform signal 33.

Figure 10:
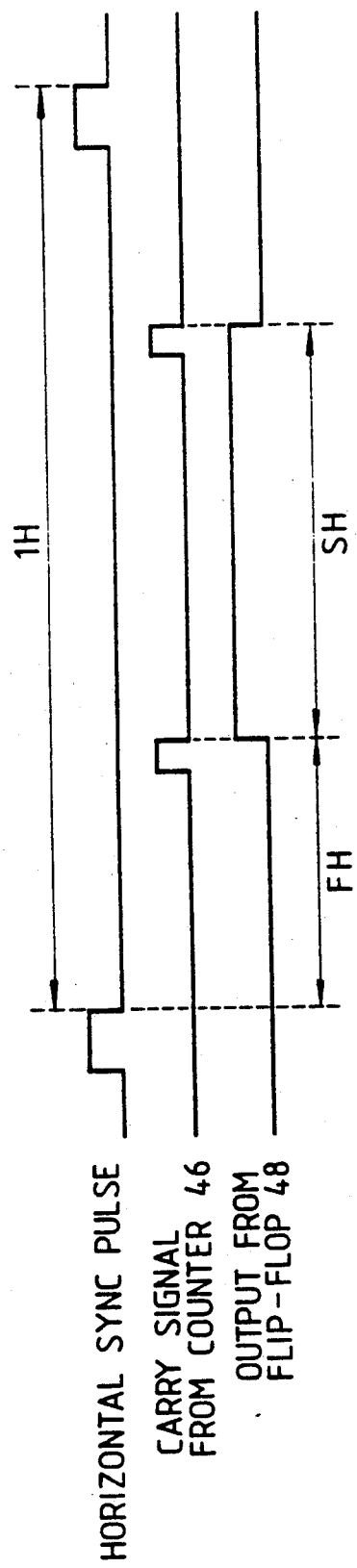
FIGS. 10 and 11 are timing diagrams showing the waveforms of various signals in the wipe waveform signal generator of FIG. 8.

As shown in FIG. 10, the trailing edge of a first carry signal outputted from the down counter 46 occurs at a moment which follows the moment of the occurrence of the trailing edge of a horizontal sync pulse by an interval determined by the rectangular-area horizontal starting position FH. During the interval between the moments of the occurrence of the trailing edges of the horizontal sync pulse and the first carry signal, the output signal from the flip-flop 48, that is, the horizontal wipe waveform signal 33 remains "0". At the moment of the occurrence of the trailing edge of the first carry signal, the horizontal wipe waveform signal 33 changes to "1". The trailing edge of a second carry signal outputted from the down counter 46 occurs at a moment which follows the moment of the occurrence of the trailing edge of the first carry signal by an interval determined by the rectangular-area horizontal width SH. During the interval between the moments of the occurrence of the trailing edges of the first carry signal and the second carry signal, the output signal from the flip-flop 48, that is, the horizontal wipe waveform signal 33 remains "1". At the moment of the occurrence of the trailing edge of the second carry signal, the horizontal wipe waveform signal 33 returns to "0".

As shown in FIG. 9, the change signal generator 14 also includes a selector 49, a down counter 410, a controller 411, and a flip-flop 412. The selector 49 receives the signals representative of the rectangular-area vertical width SV and the rectangular-area vertical starting position FV via terminals 43 and 44 respectively. The selector 49 selects one of the SV signal and the FV signal in response to a control signal fed from the controller 411, and transmits the selected signal to the down counter 410. Specifically, the controller 411 changes the selector 49 in synchronism with a vertical sync pulse fed from a terminal 415, so that the FV signal is selected by the selector 49. In addition, the controller 411 controls the down counter 410 so that the down counter 410 is loaded with the FV signal. At the same time, the controller 411 outputs a signal to the flip-flop 412 which enables the flip-flop 412 to outputs a "0" signal. Then, the down counter 410 counts down from the number FV to 0 at a predetermined period. When the count number reaches 0, the down counter 410 outputs a first carry signal to the controller 411. The controller 411 changes the selector 49 in response to the first carry signal, so that the SV signal is selected by the selector 49. In addition, the controller 411 controls the down counter 410 so that the down counter 410 is loaded with the SV signal. At the same time, the controller 411 outputs a signal to the flip-flop 412 which enables the output signal from the flip-flop 412 to change to "1". Then, the down counter 410 counts down from the number SV to 0 at the predetermined period. When the count number reaches 0, the down counter 410 outputs a second carry signal to the controller 411. The controller 411 outputs a signal to the flip-flop 412 in response to the second carry signal, returning the output signal from the flip-flop 412 to "0". Such operations are periodically reiterated. The output signal from the flip-flop 412 is a vertical wipe waveform signal 34.

Figure 11:
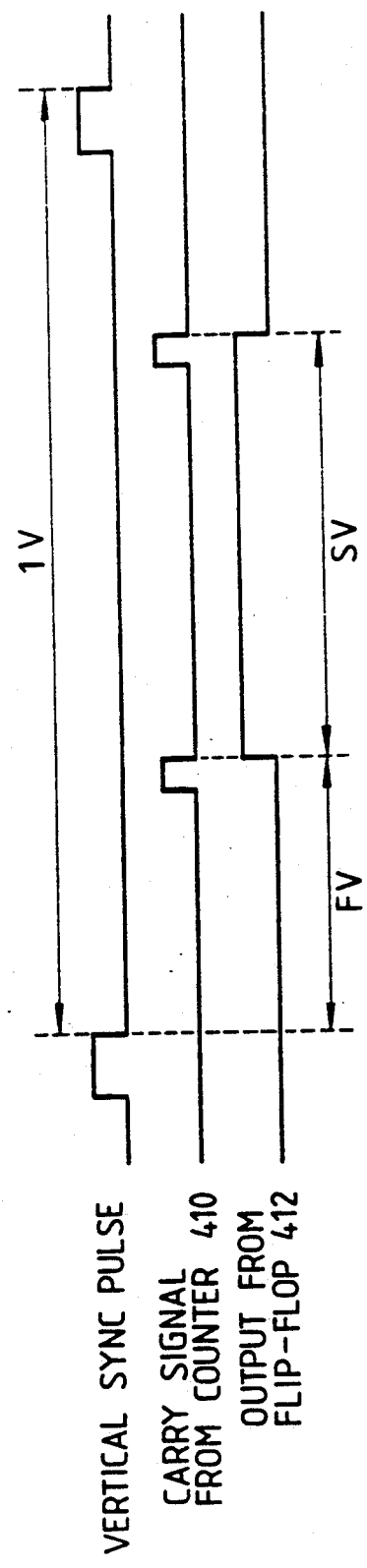

As shown in FIG. 11, the trailing edge of a first carry signal outputted from the down counter 410 occurs at a moment which follows the moment of the occurrence of the trailing edge of a vertical sync pulse by an interval determined by the rectangular-area vertical starting position FV. During the interval between the moments of the occurrence of the trailing edges of the vertical sync pulse and the first carry signal, the output signal from the flip-flop 412, that is, the vertical wipe waveform signal 34 remains "0". At the moment of the occurrence of the trailing edge of the first carry signal, the vertical wipe waveform signal 34 changes to "1". The trailing edge of a second carry signal outputted from the down counter 410 occurs at a moment which follows the moment of the occurrence of the trailing edge of the first carry signal by an interval determined by the rectangular-area vertical width SV. During the interval between the moments of the occurrence of the trailing edges of the first carry signal and the second carry signal, the output signal from the flip-flop 412, that is, the horizontal wipe waveform signal 34 remains "1". At the moment of the occurrence of the trailing edge of the second carry signal, the vertical wipe waveform signal 34 returns to "0".

As shown in FIG. 9, the change signal generator 14 further includes an AND circuit 413 which receives the horizontal wipe waveform signal 33 and the vertical wipe waveform signal 34 from the flip-flops 48 and 412. The AND circuit 413 executes a logic AND operation between the horizontal wipe waveform signal 33 and the vertical wipe waveform signal 34, combining the signals 33 and 34 into a final wipe waveform signal. The final wipe waveform signal is transmitted from the AND circuit 413 to the video switch 117 (see FIG. 8) via the terminal 116.

Figure 12:
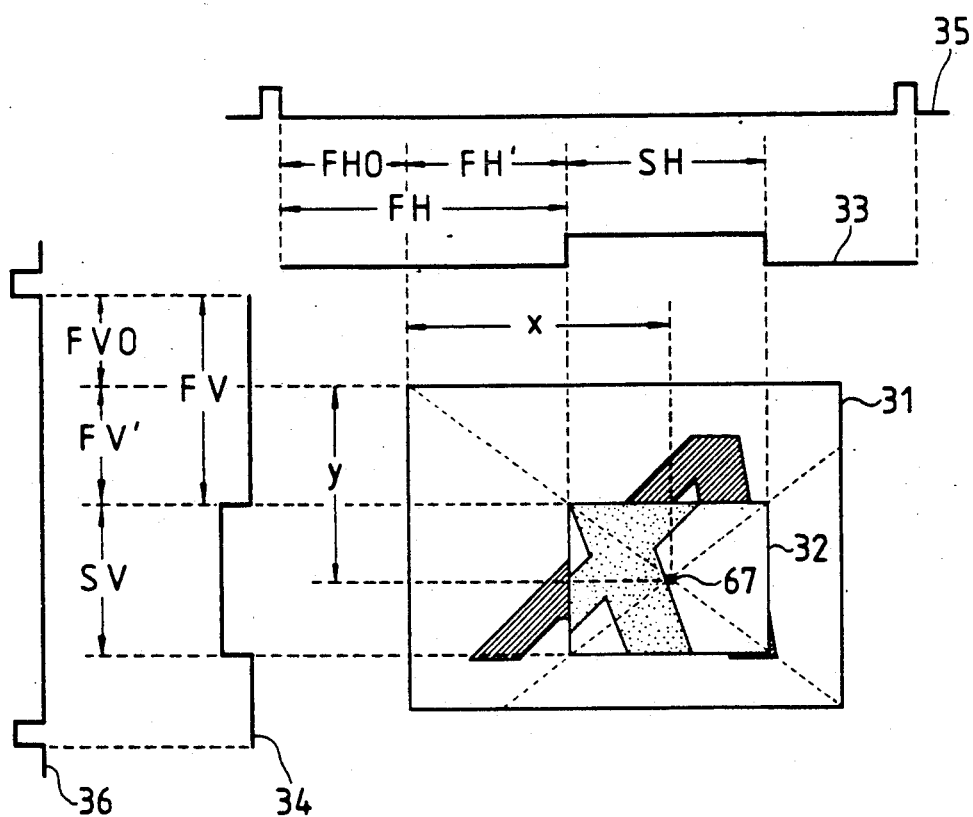
FIG. 12 is a diagram showing the relation between separated areas of a screen and various signals in the wipe waveform signal generator of FIG. 8.

As shown in FIG. 12, the horizontal position and the horizontal dimension of a rectangular wipe area 32 within a screen 31 are determined by the horizontal wipe waveform signal 33. The position of the left-hand vertical edge (the starting edge) of the rectangular wipe area 32 corresponds to the moment of the change of the horizontal wipe waveform signal 33 from "0" to "1" which is determined by the rectangular-area horizontal starting position FH. The horizontal dimension of the rectangular wipe area 32 corresponds to the period during which the horizontal wipe waveform signal 33 assumes "1", this period being determined by the rectangular-area horizontal width SH. In addition, the vertical position and the vertical dimension of the rectangular wipe area 32 are determined by the vertical wipe waveform signal 34. The position of the upper horizontal edge (the starting edge) of the rectangular wipe area 32 corresponds to the moment of the change of the vertical wipe waveform signal 34 from "0" to "1" which is determined by the rectangular-area vertical starting position FV. The vertical dimension of the rectangular wipe area 32 corresponds to the period during which the vertical wipe waveform signal 34 assumes "1", this period being determined by the rectangular-area vertical width SV. Furthermore, the position of the center 67 of the rectangular wipe area 32 is determined by the values "x" and "y" in the previously-mentioned equations (2) and (4). The rectangular-area horizontal starting position FH is equal to the sum of the values FH' and FH0. The rectangular-area vertical starting position FV is equal to the sum of the values FV' and FV0.

Figure 13:
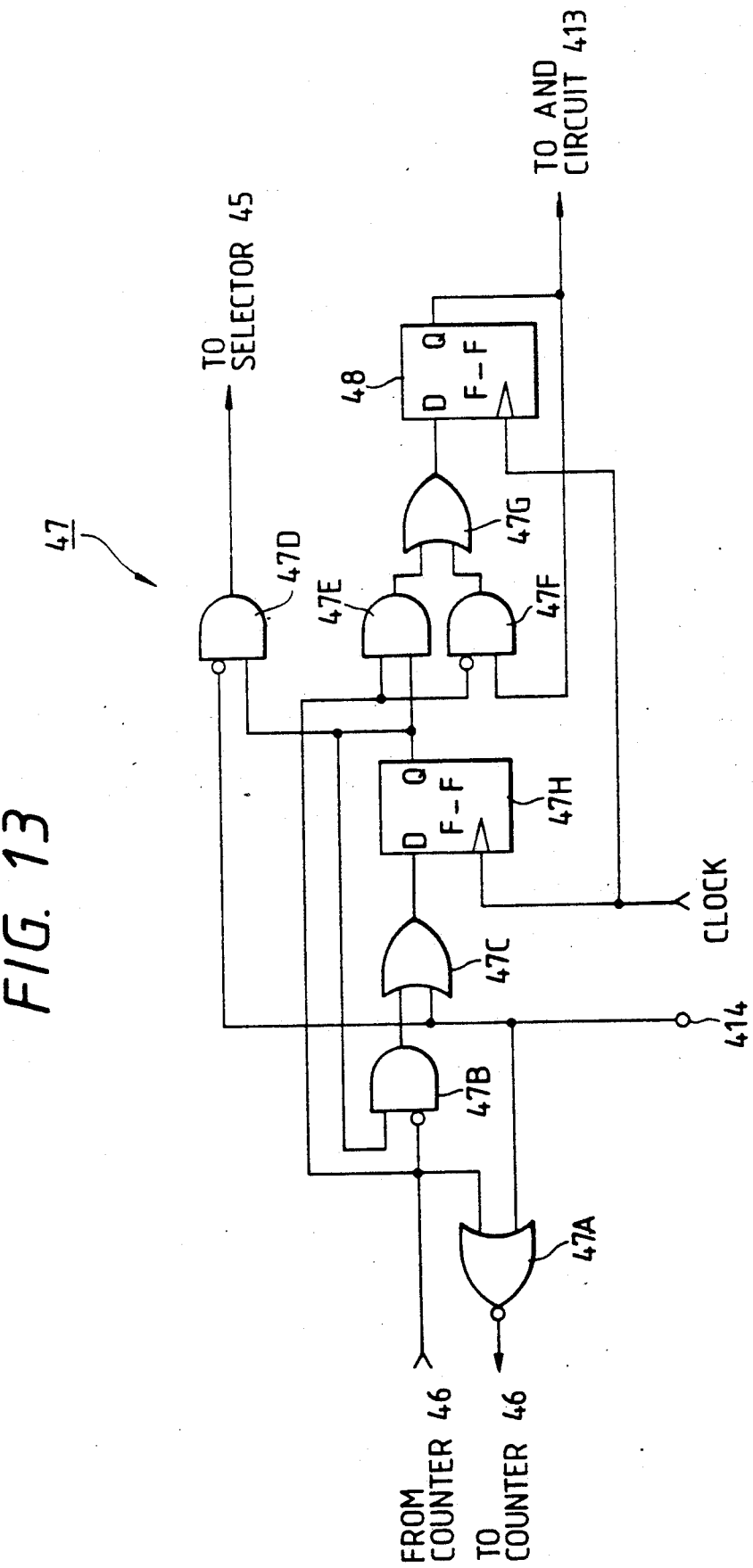
FIG. 13 is a block diagram of the controller of FIG. 9.

The controllers 47 and 411 have similar internal designs, and only the controller 47 will be described in detail hereinafter. As shown in FIG. 13, the controller 47 includes gates 47A-47G and a flip-flop 47H. A first input terminal of the gate 47A receives a carry signal from the down counter 46. A second input terminal of the gate 47A receives a horizontal sync pulse via the terminal 414. In response to the carry signal and the horizontal sync pulse, the gate 47A generates a control signal for the down counter 46 which enables the down counter 46 to be loaded with a signal transmitted from the selector 45. First input terminals of the gates 47B, 47E, and 47F receive the carry signal from the down counter 46. First input terminals of the gates 47C and 47D receive the horizontal clock pulse via the terminal 414. The second input terminal of the gate 47B receives a signal from the Q output terminal of the flip-flop 47H. The output signal from the gate 47B is applied to the second input terminal of the gate 47C. The output terminal of the gate 47C is applied to the D input terminal of the flip-flop 47H. A fixed-frequency clock signal is applied to the clock terminal of the flip-flop 47H. The output signal from the gate 47C is sampled and latched by the flip-flop 47H in response to the clock signal. The signal outputted from the Q output terminal of the flip-flop 47H is fed to the second input terminals of the gates 47D and 47E. The gate 47D generates a control signal for the selector 45 in response to the horizontal sync pulse and the output signal from the flip-flop 47H. The output signal from the gate 47E is fed to a first input terminal of the gate 47G. The second input terminal of the gate 47F receives a signal from the Q output terminal of the flip-flop 48. The output signal from the gate 47F is fed to a second input terminal of the gate 47G. The output signal from the gate 47G is applied to the D input terminal of the flip-flop 48. The clock signal is applied to the clock terminal of the flip-flop 48. The output signal from the gate 47G is sampled and latched by the flip-flop 48 in response to the clock signal. The signal outputted from the Q output terminal of the flip-flop 48 is a horizontal wipe waveform signal 33 which is transmitted to the AND circuit 413.

The controller 411 receives a vertical sync pulse in place of the horizontal sync pulse. In addition, the controller 411 is connected to the devices 49, 410, and 412 in place of the devices 45, 46, and 48.

Figure 14:
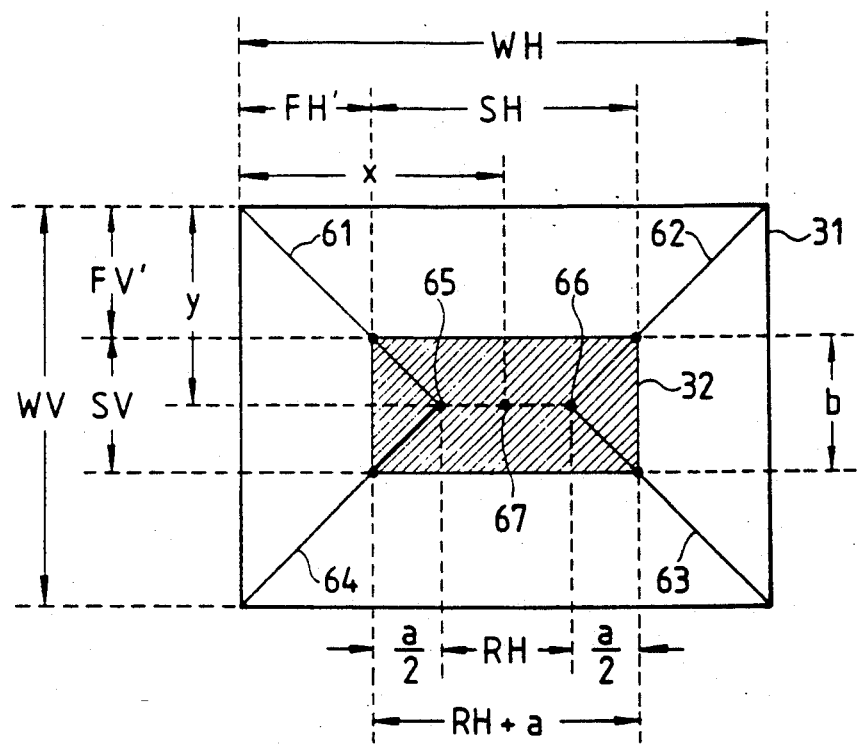
FIGS. 14 and 16 are diagrams showing the relation between separated areas of a screen and various parameters in the wipe waveform signal generator of FIG. 8.

Wipe operation will be described hereinafter. FIG. 14 shows a state of the screen 31 which occurs during the wipe operation under conditions where the center 67 of a rectangular wipe area 32 coincides with the center of the screen 31 ($x = WH/2$, $y = WV/2$), and where the horizontal extended width RH and the vertical extended width RV are set as "$0 \leq RH \leq WH$" and "$RV = 0$". As suggested from FIG. 14, these conditions correspond to a rectangular wipe area elongated horizontally. Under these conditions, since the vertical extended width RV is equal to 0, the rectangular-area horizontal width SH, the horizontal width FH' between the left-hand edge of the screen 31 and the left-hand edge of the rectangular wipe area 32, the rectangular-area vertical width SV, and the vertical width FV' between the upper edge of the screen 31 and the upper edge of the rectangular wipe area 32 are given as indicated below by referring to the previously-mentioned equations (1)-(4).

$$SH = a + RH$$

$$FH' = x - (a + RH)/2$$

$$SV = b$$

$$FV' = y - b/2$$

When the variable resistor 121 is adjusted to nullify the value "p", that is, when both the values "a" and "b" are equal to 0, the size of the rectangular wipe area 32 is minimized and the values SH, FH', SV, and FV' are given as follows.

$$SH = RH$$
$$FH' = x - RH/2$$
$$= WH/2 - RH/2$$
$$SV = 0$$
$$FV' = y$$
$$= WV/2$$

Figure 15:
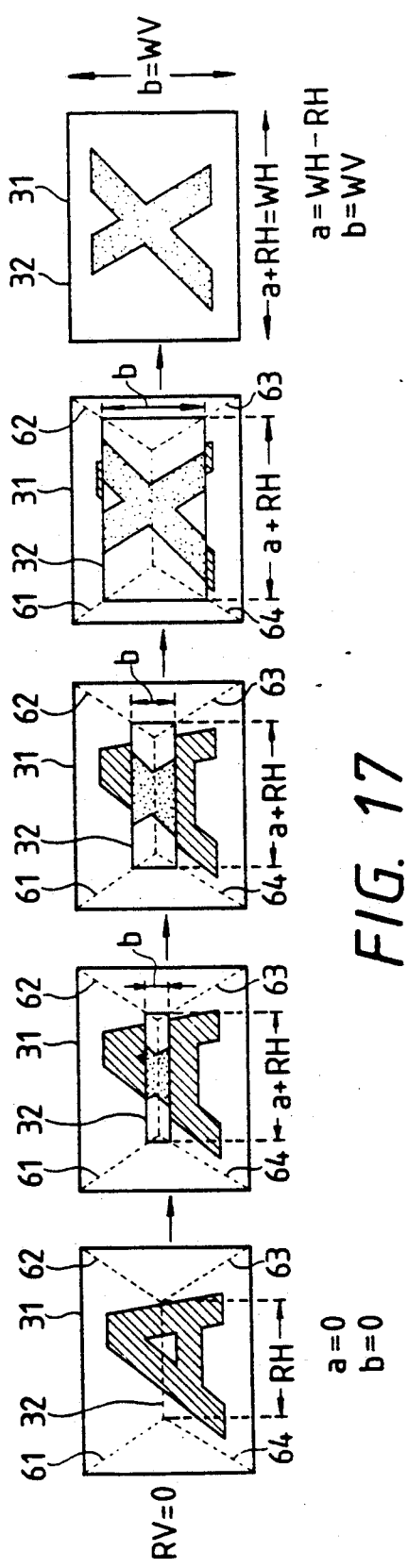
FIGS. 15, 17, and 19 are diagrams showing varying conditions of reproduced images on a screen which occur during wipe executed by the wipe waveform signal generator of FIG. 8.

In this case, the wipe area 32 agrees with a horizontal line of a length equal to the value RH which extends between points 65 and 66 and which is centered at the point 67. The screen 31 including the minimized wipe area 32 is shown in the left-end illustration of FIG. 15. As the variable resistor 121 is adjusted to increase the value "p" from 0, the wipe area 32 is changed from a line form into a rectangular form and is expanded vertically and horizontally as shown in FIG. 15. During the expansion of the rectangular wipe area 32, the left-upper, the right-upper, the right-lower, and the left-lower vertexes of the rectangular wipe area 32 move along lines 61, 62, 63, and 64 respectively. When the values "a" and "b" reach given values expressed as "a=WH−RH" and "b=WV", the size of the rectangular wipe area 32 is maximized and the values SH, FH', SV, and FV' are given as follows.

$$SH = WH$$
$$FH' = x - WH/2$$
$$= 0$$
$$SV = WV$$
$$FV' = y - WV/2$$
$$= 0$$

In this case, the rectangular wipe area 32 agrees with the screen 31. The screen 31 including the maximized wipe area 32 is shown in the right-end illustration of FIG. 15. During the expansion of the rectangular wipe area 32, since all the values SH, FH', SV, and FV' vary linearly, the lines 61–64 along which the vertexes of the rectangular wipe area 32 move are straight. The value RH determines the horizontal length of the minimized wipe area 32. When the value RH is equal to 0, the points 65 and 66 coincide with the center 67 with respect to the minimized wipe area 32. In the case where the value RH is equal to 0, during the expansion of the rectangular wipe area 32, the rectangular wipe area 32 remains similar in shape to the screen 31.

Figure 16:
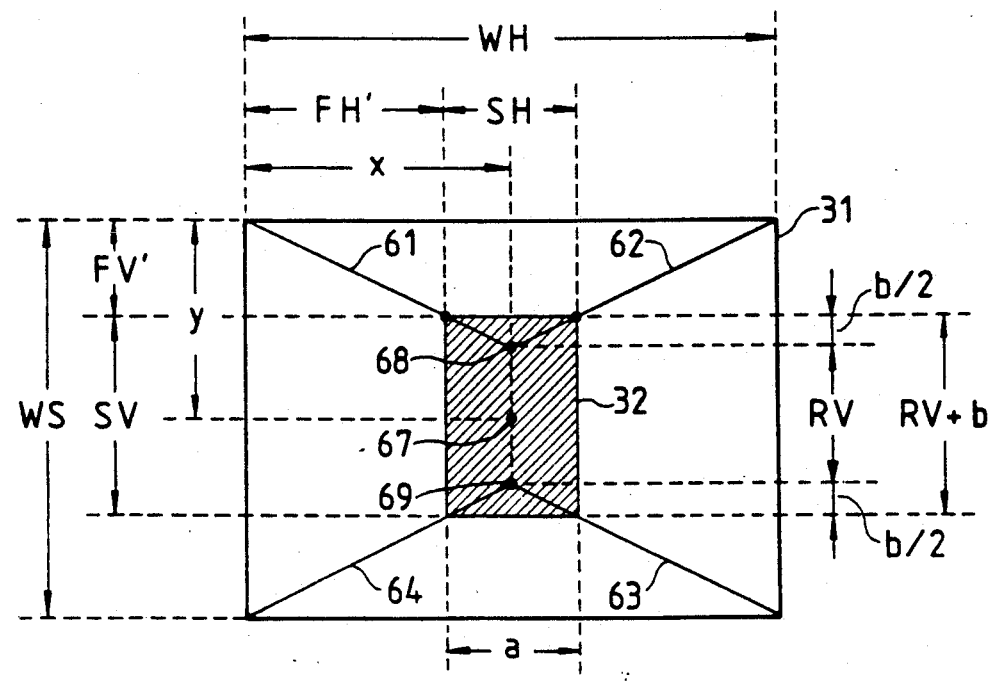

FIG. 16 shows a state of the screen 31 which occurs during the wipe operation under conditions where the center 67 of a rectangular wipe area 32 coincides with the center of the screen 31 (x=WH/2, y=WV/2), and where the horizontal extended width RH and the vertical extended width RV are set as "RH=0" and "0≦RV≦WV". As suggested from FIG. 16, these conditions correspond to a rectangular wipe area elongated vertically. Under these conditions, since the horizontal extended width RH is equal to 0, the rectangular-area horizontal width SH, the horizontal width FH' between the left-hand edge of the screen 31 and the left-hand edge of the rectangular wipe area 32, the rectangular-area vertical width SV, and the vertical width FV' between the upper edge of the screen 31 and the upper edge of the rectangular wipe area 32 are given as indicated below by referring to the previously-mentioned equations (1)–(4).

$$SH = a$$
$$FH' = x - a/2$$
$$SV = b + RV$$
$$FV' = y - (b + RV)/2$$

When the variable resistor 121 is adjusted to nullify the value "p", that is, when both the values "a" and "b" are equal to 0, the size of the rectangular wipe area 32 is minimized and the values SH, FH', SV, and FV' are given as follows.

$$SH = 0$$
$$FH' = x$$
$$= WH/2$$
$$SV = RV$$
$$FV' = y - RV/2$$
$$= WV/2 - RV/2$$

Figure 17:
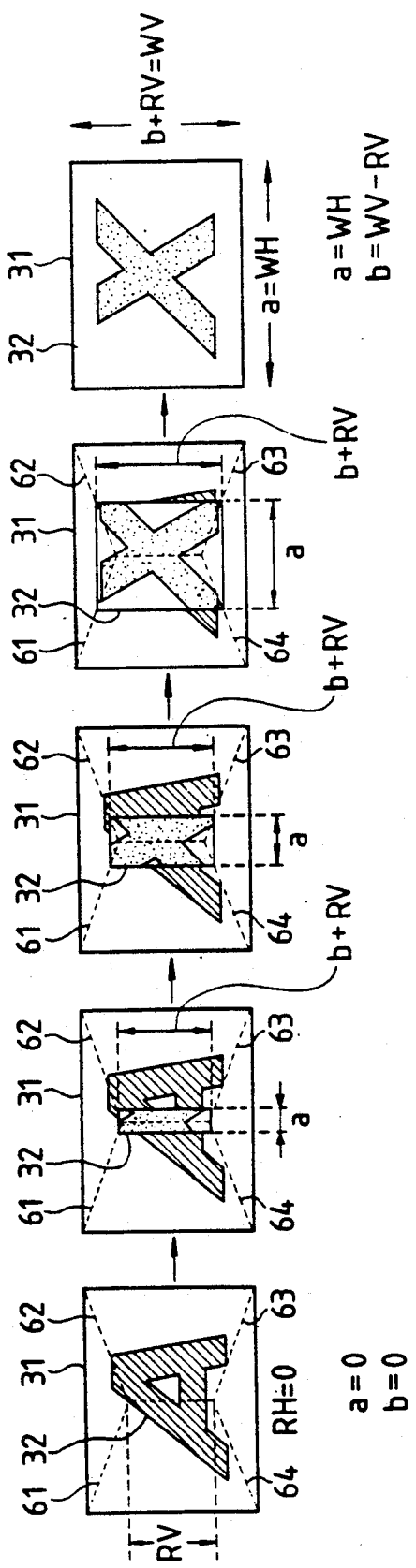

In this case, the wipe area 32 agrees with a vertical line of the length equal to the value RV which extends between points 68 and 69 and which is centered at the point 67. The screen 31 including the minimized wipe area 32 is shown in the left-end illustration of FIG. 17. As the variable resistor 121 is adjusted to increase the value "p" from 0, the wipe area 32 is changed from a line form into a rectangular form and is expanded vertically and horizontally as shown in FIG. 17. During the expansion of the rectangular wipe area 32, the left-upper, the right-upper, the right-lower, and the left-lower vertexes of the rectangular wipe area 32 move along lines 61, 62, 63, and 64 respectively. When the values "a" and "b" reach given values expressed as "a=WH" and "b=WV−RV", the size of the rectangular wipe area 32 is maximized and the values SH, FH', SV, and FV' are given as follows.

$$SH = WH$$
$$FH' = x - WH/2$$
$$= 0$$
$$SV = WV$$
$$FV' = y - WV/2$$
$$= 0$$

In this case, the rectangular wipe area 31 agrees with the screen 31. The screen 31 including the maximized wipe area 32 is shown in the right-end illustration of FIG. 17. During the expansion of the rectangular wipe area 32, since all the values SH, FH', SV, and FV' vary linearly, the lines 61–64 along which the vertexes of the rectangular wipe area 32 move are straight. The value RV determines the vertical length of the minimized wipe area 32. When the value RV is equal to 0, the points 68 and 69 coincide with the center 67 with respect to the minimized wipe area 32. In the case where the value RV is equal to 0, during the expansion of the rectangular wipe area 32, the rectangular wipe area 32 remains similar in shape to the screen 31.

Figure 18:
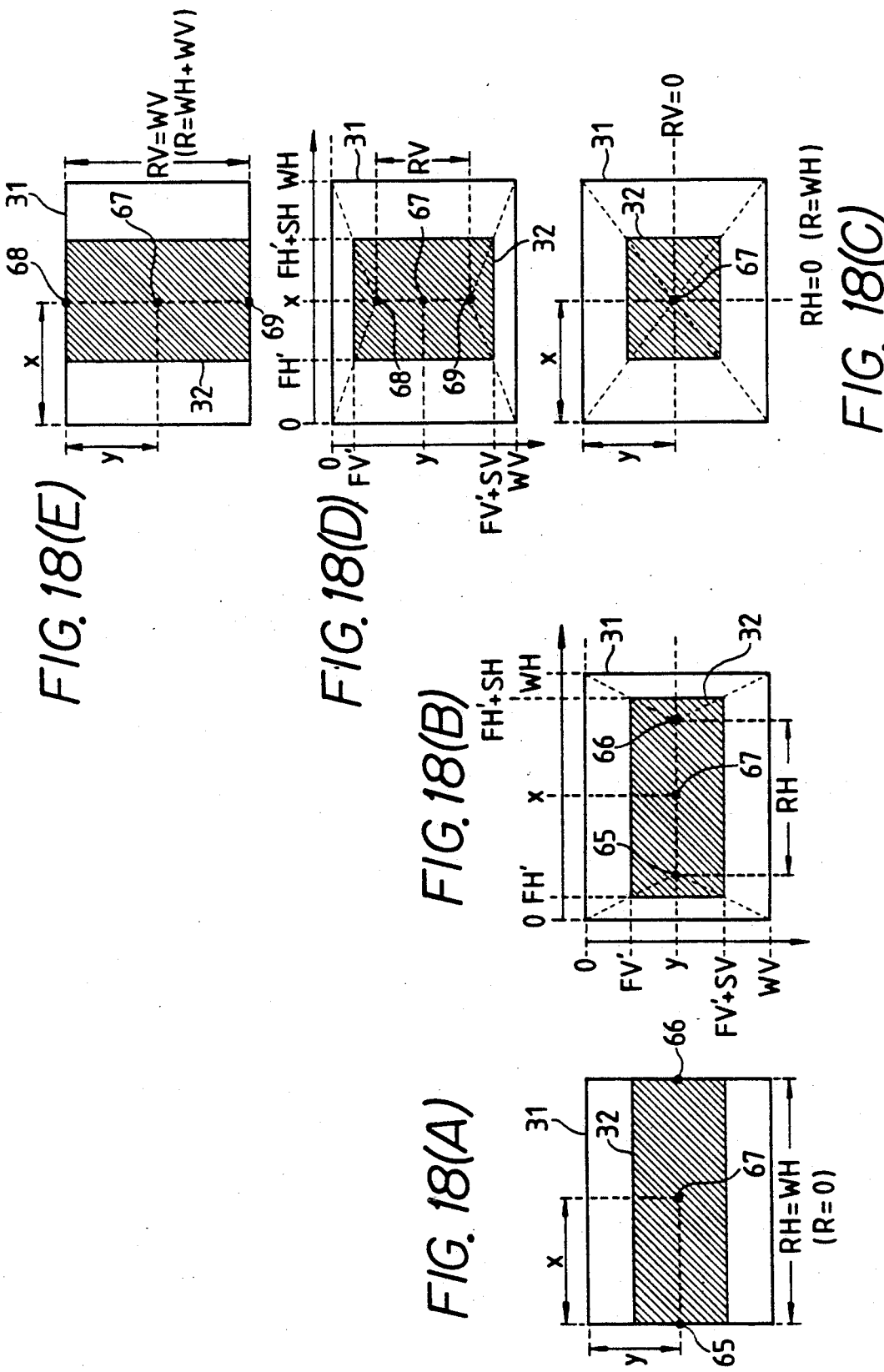
FIG. 18 is a diagram showing varying wipe areas in the screen which are realized by the wipe waveform signal generator of FIG. 8.

As understood from the previous description, the intrinsic shape of the rectangular wipe area 32 can be changed by varying the values RH and RV. The wipe waveform extended width holding section 11 is designed so as to enable variations in the values RH and RV. As shown in FIG. 8, the wipe waveform extended width holding section 11 includes a numerical value holding circuit 110 and a wipe waveform extended width calculator 111. The numerical value holding circuit 110 includes a combination of a constant voltage source and a variable resistor 122, generating a signal whose voltage depends on the position of a control shaft of the variable resistor 122. The generated voltage signal is converted by an A/D converter within the numerical value holding circuit 110 into a corresponding digital signal, which is outputted from the numerical value holding circuit 110 as a signal representing a basic wipe waveform extended width R. The basic wipe waveform extended width R is chosen as "$0 \leq R \leq WH+WV$". The wipe waveform extended width calculator 111 calculates a horizontal extended width RH and a vertical extended width RV from the basic wipe waveform extended width R. Signals representing the horizontal extended width RH and the vertical extended width RV are transmitted from the wipe waveform extended width calculator 111 to the wipe waveform calculator 13 via the terminals 114 and 115 respectively. Specifically, the wipe waveform extended width calculator 111 includes a signal generator (no reference character) outputting a signal representative of the value WH, and first and second substracters (no reference character) which receive the signal representative of the basic width R and the signal representative of the value WH. The first subtracter subtracts the basic width R from the value WH. The second subtracter subtracts the value WH from the basic width R. The output signals from the subtracters are fed to a selector 113 within the wipe waveform extended width calculator 11. The wipe waveform extended width calculator 11 also includes a comparator 112, and a signal generator (no reference character) outputting a signal representative of the value "0" to the selector 113. The comparator 112 receives the signal representative of the basic width R and the signal representative of the value WH, and compares the values R and WH. The selector 113 is changed by the output signal from the comparator 112. When the values R and WH has a relation as "$R \leq WH$", the output signal from the comparator 112 changes the selector 113 to a state where the output signal from the first subtracter which represents the value "WH−R" is selected as the signal representative of the horizontal extended width RH while the signal representative of "0" is selected as the signal representative of the vertical extended width RV. The signals representative of the horizontal extended width RH and the vertical extended with RV are outputted from the selector 113 to the wipe waveform calculator 13 via the terminals 114 and 115 respectively. This case corresponds to the horizontally-elongated wipe area 32 of FIGS. 14 and 15. In this case, as the basic width R is increased from 0 to the value WH by operating the variable resistor 122, the horizontal extended width RH decreases from the value WH to 0 as shown in the parts (A)–(C) of FIG. 18. On the other hand, when the values R and WH has a relation as "$R \geq WH$", the output signal from the comparator 112 changes the selector 113 to a state where the signal representative of "0" is selected as the signal representative of the horizontal extended width RH while the output signal from the second subtracter which represents the value "R−WH" is selected as the signal representative of the vertical extended width RV. The signals representative of the horizontal extended width RH and the vertical extended with RV are outputted from the selector 113 to the wipe waveform calculator 13 via the terminals 114 and 115 respectively. This case corresponds to the vertically-elongated wipe area 32 of FIGS. 16 and 17. In this case, as the basic width R is increased from the value WH to the value WH+WV by operating the variable resistor 122, the vertical extended width RV increases from 0 to the value WV as shown in the parts (C)–(E) of FIG. 18. It should be noted that the wipe waveform extended width calculator 111 can be a microcomputer.

Figure 19:
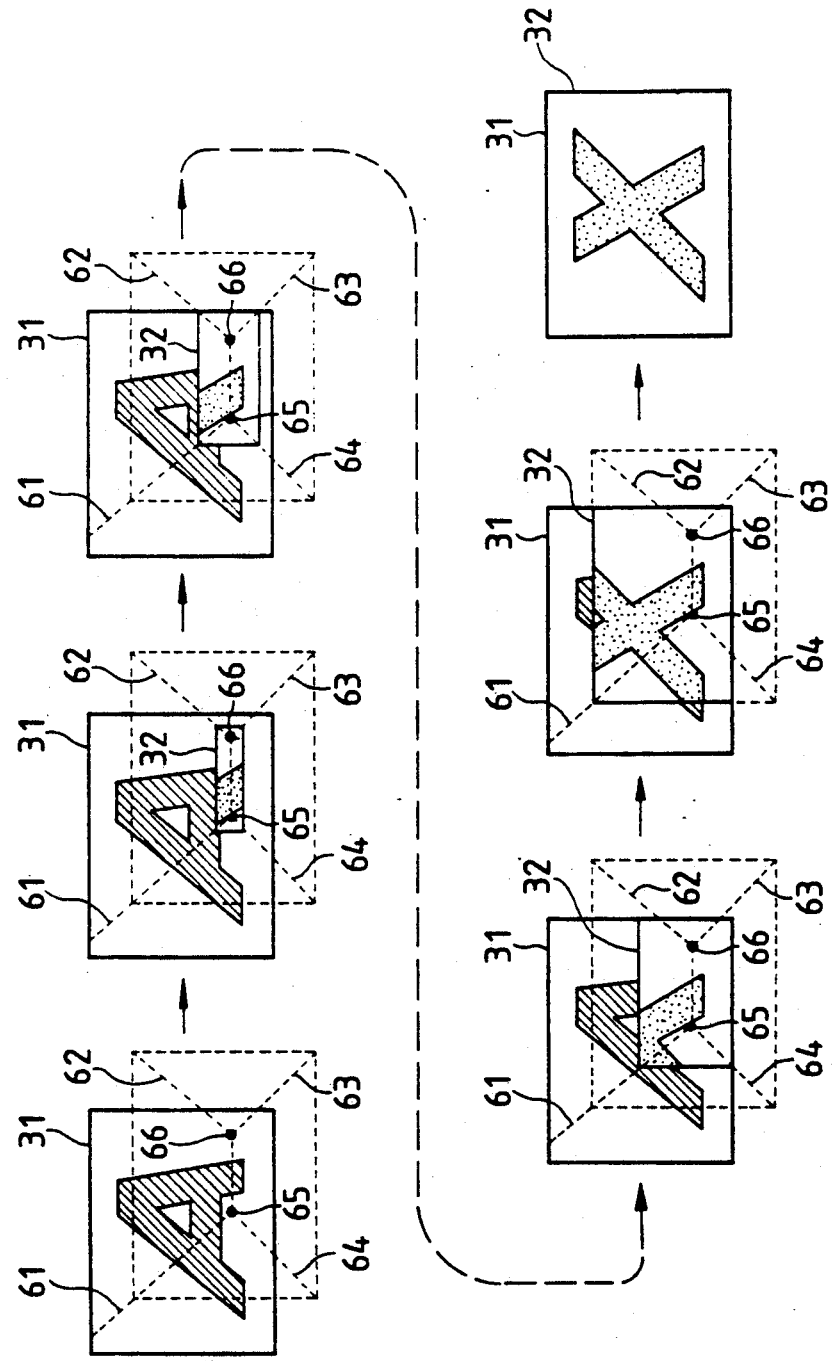

FIG. 19 shows pictures which are indicated on the rectangular screen 31 during the wipe operation under conditions where the center 67 of the rectangular wipe area 32 is rightwardly and downwardly offset from the center of the screen 31. As shown in FIG. 19, during the wipe, the right-hand edge of the rectangular wipe area 32 reaches the right-hand edge of the screen 31 before the other edges of the rectangular wipe area 32 reach the corresponding edges of the screen 31. In addition, after the right-hand edge of the rectangular wipe area 32 reaches the right-hand edge of the screen 31, the shape of the rectangular wipe area 32 within the screen 31 becomes different from its preceding rectangular shape.

DESCRIPTION OF THE SECOND PREFERRED EMBODIMENT

Figure 20:
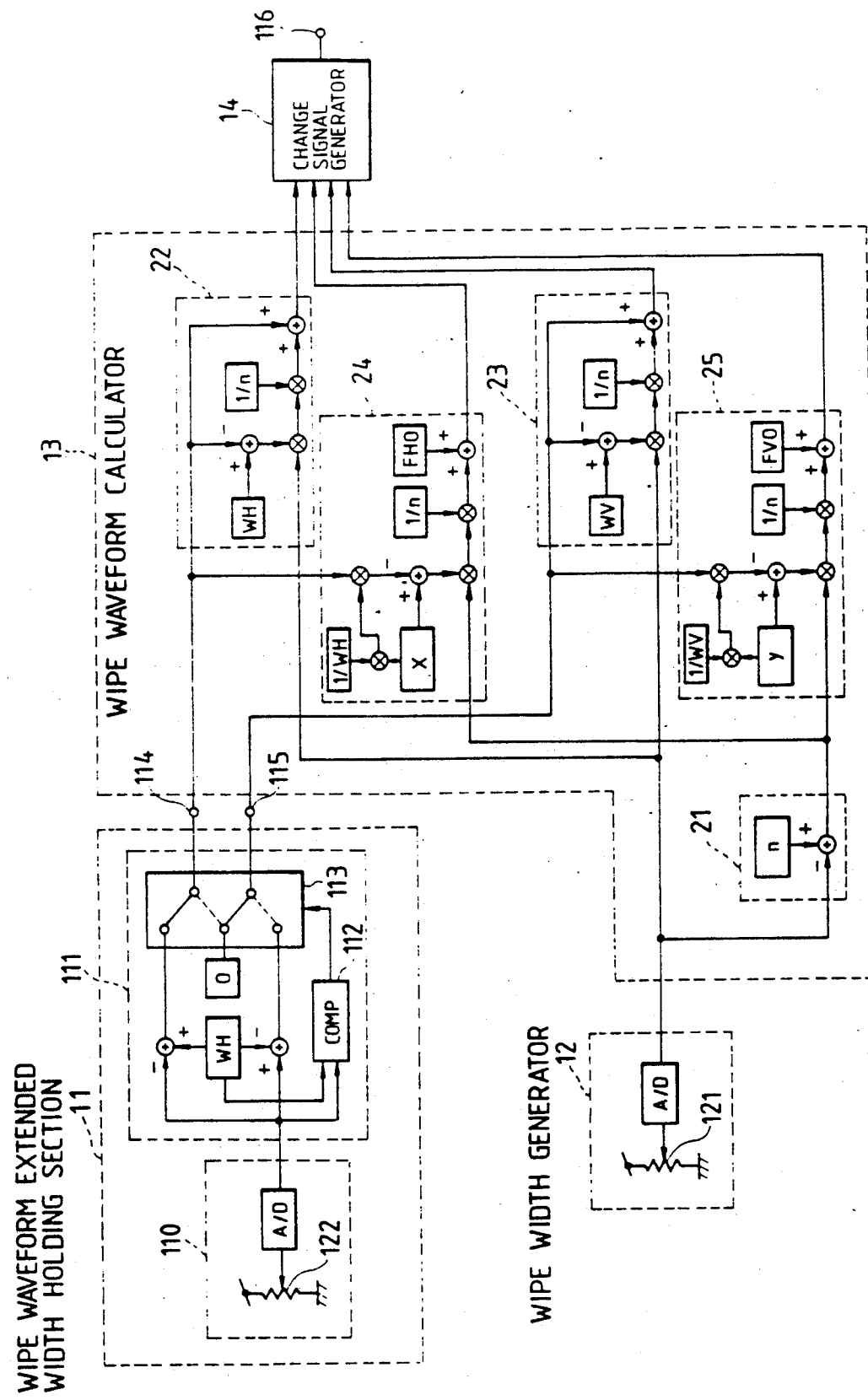
FIG. 20 is a block diagram of a wipe waveform signal generator according to a second embodiment of this invention.

FIG. 20 shows a second embodiment of this invention which is similar to the embodiment of FIGS. 8–19 except for the internal design of a wipe waveform calculator 13. In the embodiment of FIG. 20, the wipe waveform calculator 13 includes calculating circuits 21, 22, 23, 24, and 25.

The calculating circuit 21 receives the output signal from a wipe width generator 12 which represents a numerical value "q" chosen as "$0 \leq q \leq n$" where "n" denotes a predetermined constant. The calculating circuit 21 includes a signal generator (no reference character) and a subtracter (no reference character). The signal generator outputs a signal representative of the value "n" to the subtracter. The subtracter also receives the signal representative of the value "q". The subtracter subtracts the value "q" from the value "n", outputting a signal representative of the value "n−q" to the calculating circuits 24 and 25.

The calculating circuit 22 receives the signal representative of the value "q". In addition, the calculating circuit 22 receives the output signal from a wipe waveform extended width holding section 11 which represents a horizontal extended width RH. The calculating circuit 22 includes a signal generator (no reference character) outputting a signal representative of the value WH, and a signal generator (no reference character) outputting a signal representative of the value 1/n. The calculating circuit 22 also includes multipliers, a subtracter, and an adder (no reference character), deciding a rectangular-area horizontal width SH on the basis of the values "q", RH, 1/n, and WH by executing the following calculation.

$$SH = (WH - RH) \cdot q/n + RH \tag{5}$$

The calculating circuit 22 outputs a signal representative of the rectangular-area horizontal width SH to a change signal generator 14.

The calculating circuit 23 receives the signal representative of the value "q". In addition, the calculating circuit 23 receives the output signal from the wipe waveform extended width holding section 11 which represents a vertical extended width RV. The calculating circuit 23 includes a signal generator (no reference character) outputting a signal representative of the value WV, and a signal generator (no reference character) outputting a signal representative of the value 1/n. The calculating circuit 23 also includes multipliers, a subtracter, and an adder (no reference character), deciding a rectangular-area vertical width SV on the basis of the values "q", RV, 1/n, and WV by executing the following calculation.

$$SV = (WV - RV) \cdot q/n + RV \quad (6)$$

The calculating circuit 23 outputs a signal representative of the rectangular-area vertical width SV to the change signal generator 14.

The calculating circuit 24 receives the signal representative of the value "n−q". In addition, the calculating circuit 24 receives the output signal from the wipe waveform extended width holding section 11 which represents the horizontal extended width RH. The calculating circuit 24 includes a signal generator (no reference character) outputting a signal representative of the value 1/WH, a signal generator (no reference character) outputting a signal representative of the value "x", a signal generator (no reference character) outputting a signal representative of the value 1/n, and a signal generator (no reference character) outputting a signal representative of the value FH0. The calculating circuit 24 also includes multipliers, a subtracter, and an adder (no reference character), deciding a rectangular-area horizontal starting position FH on the basis of the values 1/WH, "x", 1/n, and FH0 by executing the following calculation.

$$\begin{aligned} FH &= (x - x \cdot RH/WH) \cdot (n - q)/n + FH0 \\ &= FH' + FH0 \\ FH' &= (x - x \cdot RH/WH) \cdot (n - q)/n \end{aligned} \quad (7)$$

The calculating circuit 24 outputs a signal representative of the rectangular-area horizontal starting position FH to the change signal generator 14.

The calculating circuit 25 receives the signal representative of the value "n−q". In addition, the calculating circuit 25 receives the output signal from the wipe waveform extended width holding section 11 which represents the vertical extended width RV. The calculating circuit 25 includes a signal generator (no reference character) outputting a signal representative of the value 1/WV, a signal generator (no reference character) outputting a signal representative of the value "y", a signal generator (no reference character) outputting a signal representative of the value 1/n, and a signal generator (no reference character) outputting a signal representative of the value FV0. The calculating circuit 25 also includes multipliers, a subtracter, and an adder (no reference character), deciding a rectangular-area vertical starting position FV on the basis of the values 1/WV, "y", 1/n, and FV0 by executing the following calculation.

$$\begin{aligned} FV &= (y - y \cdot RV/WV) \cdot (n - q)/n + FV0 \\ &= FV' + FV0 \\ FV' &= (y - y \cdot RV/WV) \cdot (n - q)/n \end{aligned} \quad (8)$$

The calculating circuit 25 outputs a signal representative of the rectangular-area vertical starting position FV to the change signal generator 14.

In this way, the signals representing the rectangular-area horizontal width SH, the rectangular-area horizontal starting position FH, the rectangular-area vertical width SV, and the rectangular-area vertical starting position FV are outputted from the wipe waveform calculator 13 to the change signal generator 14. It should be noted that the wipe waveform calculator 13 can be a microcomputer.

Figure 21:
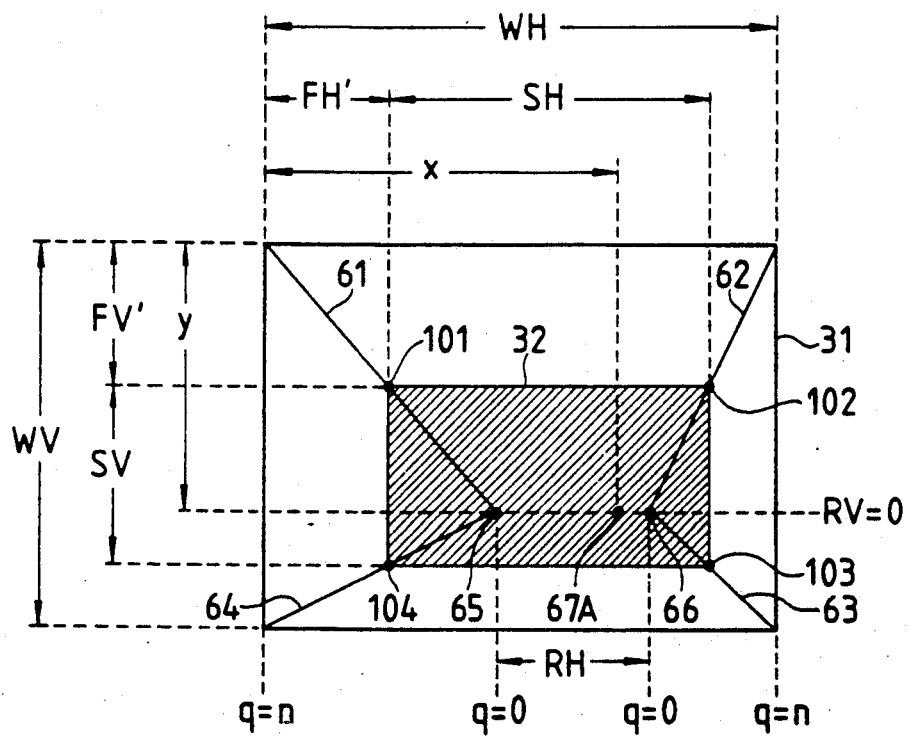
FIGS. 21 and 23 are diagrams showing the relation between separated areas of a screen and various parameters in the wipe waveform signal generator of FIG. 20.

Wipe operation will be described hereinafter. FIG. 21 shows a state of a screen 31 which occurs during the wipe operation under conditions where the center of a rectangular wipe area 32 is offset from the center of the screen 31, and where the horizontal extended width RH and the vertical extended width RV are set as "0≦RH≦WH" and "RV=0". As suggested from FIG. 21, these conditions correspond to a rectangular wipe area elongated horizontally. Under these conditions, since the vertical extended width RV is equal to 0, the rectangular-area horizontal width SH, the horizontal width FH' between the left-hand edge of the screen 31 and the left-hand edge of the rectangular wipe area 32, the rectangular-area vertical width SV, and the vertical width FV' between the upper edge of the screen 31 and the upper edge of the rectangular wipe area 32 are given as indicated below by referring to the previously-mentioned equations (5)–(8).

$$SH = (WH - RH) \cdot q/n + RH$$

$$FH' = (x - x \cdot RH/WH) \cdot (n - q)/n$$

$$SV = WV \cdot q/n$$

$$FV' = y \cdot (n - q)/n$$

When a variable resistor 121 within the wipe width generator 12 is adjusted to nullify the value "q", the size of the rectangular wipe area 32 is minimized and the values SH, FH', SV, and FV' are given as follows.

$$SH = RH$$

$$FH' = x - x \cdot RH/WH$$

$$SV = 0$$

$$FV' = y$$

Figure 22:
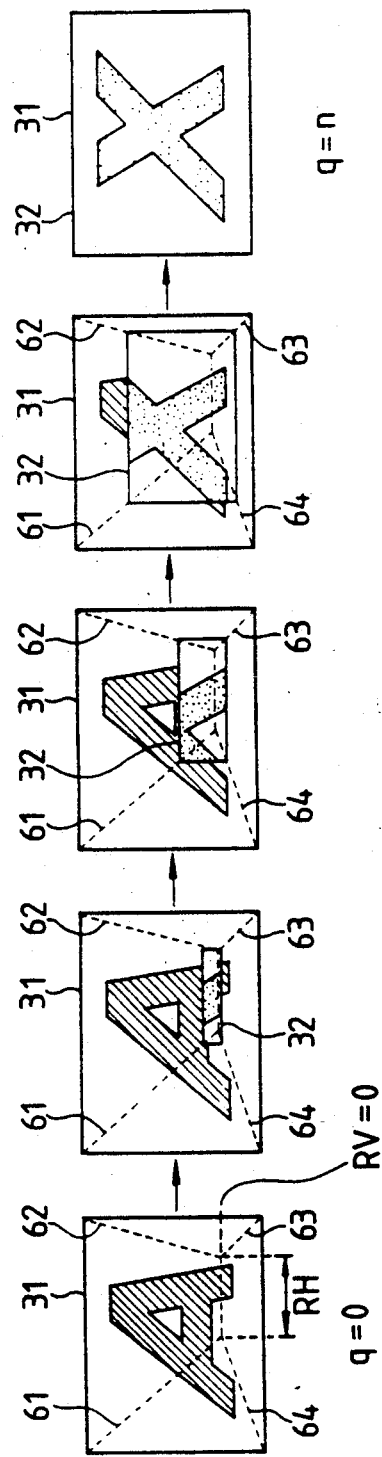
FIGS. 22 and 24 are diagrams showing varying conditions of reproduced images on a screen which occur during wipe executed by the wipe waveform signal generator of FIG. 20.

In this case, the wipe area 32 agrees with a horizontal line of a length equal to the value RH which extends between points 65 and 66. It should be noted that, in FIG. 21, the reference character 67A denotes a specified point whose position is determined by the values "x" and "y". The screen 31 including the minimized wipe area 32 is shown in the left-end illustration of FIG. 22. As the variable resistor 121 is adjusted to increase the value "q" from 0, the wipe area 32 is changed from a line form into a rectangular form and is expanded vertically and horizontally as shown in FIG. 22. During the expansion of the rectangular wipe area 32, the left-upper, the right-upper, the right-lower, and the left-lower vertexes of the rectangular wipe area 32 move along lines 61, 62, 63, and 64 respectively. When the value "q" reaches the given value "n" as expressed by "q=n", the size of the rectangular wipe area 32 is maximized and the values SH, FH', SV, and FV' are given as follows.

$$SH = WH$$

$$FH' = 0$$

$$SV = WV$$

$$FV' = 0$$

In this case, the rectangular wipe area 32 agrees with the screen 31. The screen 31 including the maximized wipe area 32 is shown in the right-end illustration of FIG. 22. During the expansion of the rectangular wipe area 32, since all the values SH, FH', SV, and FV' vary linearly, the lines 61-64 along which the vertexes of the rectangular wipe area 32 move are straight. Although the center of the rectangular wipe area 32 is offset from the center of the screen 31 before the rectangular wipe area 32 expands into agreement with the screen 31, the lines 61 and 64 extend from the point 65 to the left-upper corner and the left-lower corner of the screen 31 respectively while the lines 62 and 63 extend from the point 66 to the right-upper corner and the right-lower corner of the screen 31 respectively. Therefore, during the expansion of the rectangular wipe area 32, the four vertexes of the rectangular wipe area 32 move toward and into the corresponding corners of the screen 31. The four vertexes of the rectangular wipe area 32 reach the corresponding corners of the screen 31 at the same moment. The value RH determines the horizontal length of the minimized wipe area 32. When the value RH is equal to 0, the points 65 and 66 coincide with the specified point 67A with respect to the minimized wipe area 32. In the case where the value RH is equal to 0, during the expansion of the rectangular wipe area 32, the rectangular wipe area 32 remains similar in shape to the screen 31.

Figure 23:
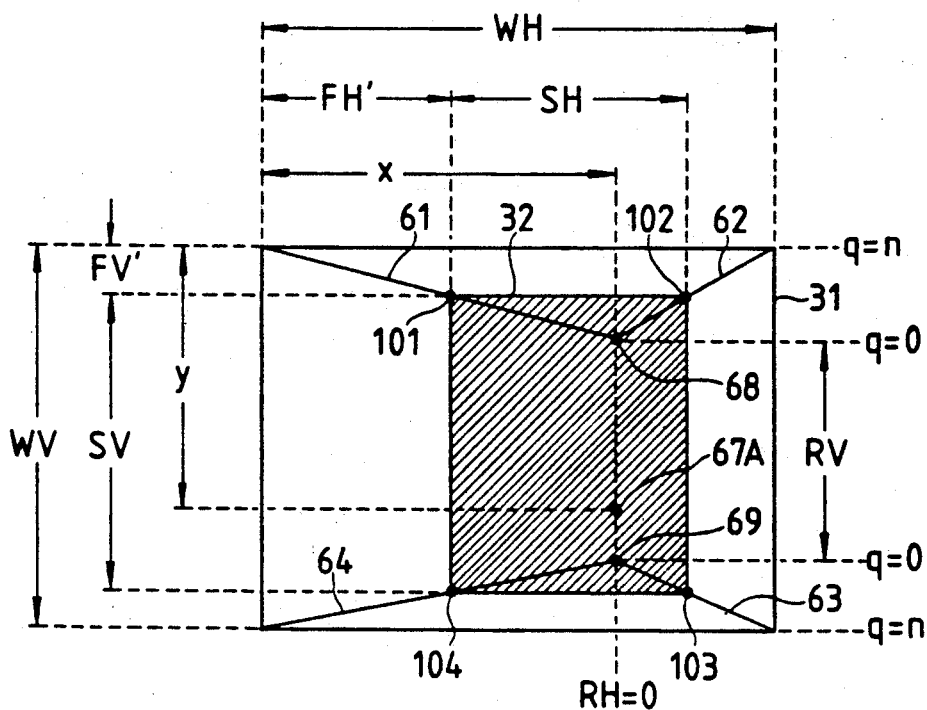

FIG. 23 shows a state of the screen 31 which occurs during the wipe operation under conditions where the center of a rectangular wipe area 32 is offset from the center of the screen 31, and where the horizontal extended width RH and the vertical extended width RV are set as "RH=0" and "0≦RV≦WV". As suggested from FIG. 23, these conditions correspond to a rectangular wipe area elongated vertically. Under these conditions, since the horizontal extended width RH is equal to 0, the rectangular-area horizontal width SH, the horizontal width FH' between the left-hand edge of the screen 31 and the left-hand edge of the rectangular wipe area 32, the rectangular-area vertical width SV, and the vertical width FV' between the upper edge of the screen 31 and the upper edge of the rectangular wipe area 32 are given as indicated below by referring to the previously-mentioned equations (5)-(8).

$$SH = WH \cdot q/n$$

$$FH' = x \cdot (n-q)/n$$

$$SV = (WV - RV) \cdot q/n + RV$$

$$FV' = (y - y \cdot RV/WV) \cdot (n-q)/n$$

When the variable resistor 121 is adjusted to nullify the value "q", the size of the rectangular wipe area 32 is minimized and the values SH, FH', SV, and FV' are given as follows.

$$SH = 0$$

$$FH' = x$$

$$SV = RV$$

$$FV' = y - y \cdot RV/WV$$

Figure 24:
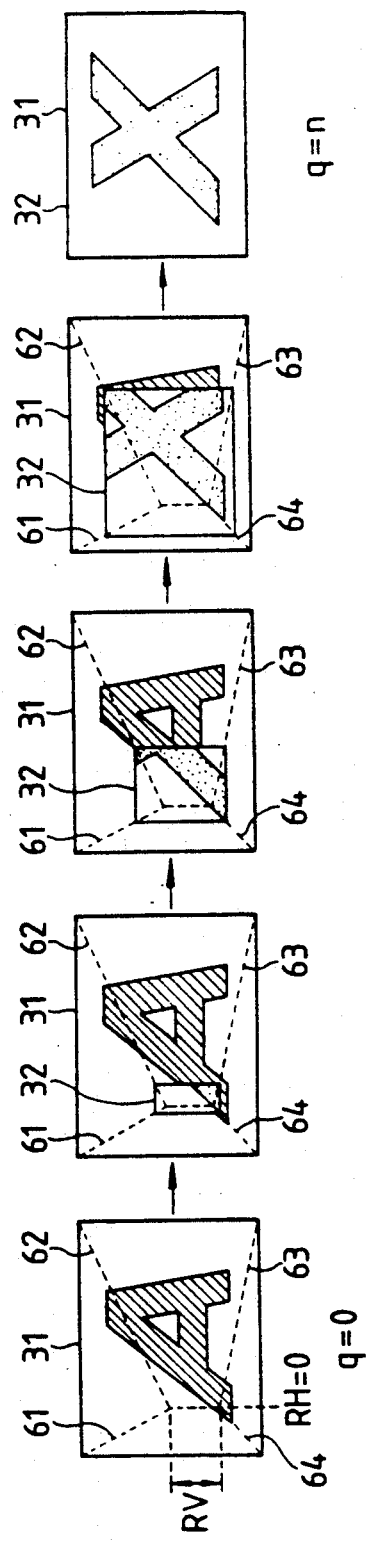

In this case, the wipe area 32 agrees with a vertical line of a length equal to the value RV which extends between points 68 and 69. It should be noted that, in FIG. 23, the reference character 67A denotes a specified point whose position is determined by the values "x" and "y". The screen 31 including the minimized wipe area 32 is shown in the left-end illustration of FIG. 24. It should be noted that the center-offset conditions of FIG. 24 are different from those of FIG. 23. As the variable resistor 121 is adjusted to increase the value "q" from 0, the wipe area 32 is changed from a line form into a rectangular form and is expanded vertically and horizontally as shown in FIG. 24. During the expansion of the rectangular wipe area 32, the left-upper, the right-upper, the right-lower, and the left-lower vertexes of the rectangular wipe area 32 move along lines 61, 62, 63, and 64 respectively. When the value "q" reaches the given value "n" as expressed by "q=n", the size of the rectangular wipe area 32 is maximized and the values SH, FH', SV, and FV' are given as follows.

$$SH = WH$$

$$FH' = 0$$

$$SV = WV$$

$$FV' = 0$$

In this case, the rectangular wipe area 32 agrees with the screen 31. The screen 31 including the maximized wipe area 32 is shown in the right-end illustration of FIG. 24. During the expansion of the rectangular wipe area 32, since all the values SH, FH', SV, and FV' vary linearly, the lines 61-64 along which the vertexes of the rectangular wipe area 32 move are straight. Although the center of the rectangular wipe area 32 is offset from the center of the screen 31 before the rectangular wipe area 32 expands into agreement with the screen 31, the lines 61 and 62 extend from the point 68 to the left-upper corner and the right-upper corner of the screen 31 respectively while the lines 63 and 64 extend from the point 69 to the right-lower corner and the left-lower corner of the screen 31 respectively. Therefore, during the expansion of the rectangular wipe area 32, the four vertexes of the rectangular wipe area 32 move toward and into the corresponding corners of the screen 31. The four vertexes of the rectangular wipe area 32 reach the corresponding corners of the screen 31 at the same moment. The value RV determines the vertical length of the minimized wipe area 32. When the value RV is equal to 0, the points 68 and 69 coincide with the specified point 67A with respect to the minimized wipe area 32. In the case where the value RV is equal to 0, during the expansion of the rectangular wipe area 32, the rectangular wipe area 32 remains similar in shape to the screen 31.

As understood from the previous description, the shape of the rectangular wipe area 32 can be changed by varying the horizontal extended width RH and the vertical extended width RV. In the case where the vertical extended width RV is equal to 0, as the horizontal extended width RH decreases from the value WH to 0, the horizontal extended dimension of the rectangular wipe area 32 decreases as shown in the parts (A)-(C) of FIG. 25. When the horizontal extended width RH reaches 0, the rectangular wipe area 32 is similar in shape to the screen 31. In the case where the horizontal extended width RH is equal to 0, as the vertical extended width RV increases from 0 to the value WV, the vertical extended dimension of the rectangular wipe area 32 increases as shown in the parts (C)-(E) of FIG. 25.

What is claimed is:

1. A wipe waveform signal generating apparatus comprising:
   a wipe width generator generating a wipe width;
   a wipe waveform extended width holding device outputting a horizontal extended width and a vertical extended width;
   a wipe waveform calculator receiving the wipe width, the horizontal extended width, and the vertical extended width, and outputting a rectangular-area horizontal width, a rectangular-area vertical width, a rectangular-area horizontal starting position, and a rectangular-area vertical starting position; and
   a change signal generator receiving the rectangular-area horizontal width, the rectangular-area vertical width, the rectangular-area horizontal starting position, and the rectangular-area vertical starting position, and outputting a wipe waveform signal.

2. The wipe waveform signal generating apparatus of claim 1 wherein the wipe waveform calculator comprises:
   a first calculating circuit receiving the wipe width and outputting a horizontal wipe width and a vertical wipe width;
   a first adder receiving the horizontal extended width and the horizontal wipe width, and outputting the rectangular-area horizontal width;
   a second adder receiving the vertical extended width and the vertical wipe width, and outputting the rectangular-area vertical width;
   a second calculating circuit receiving the rectangular-area horizontal width and outputting the rectangular-area horizontal starting position; and
   a third calculating circuit receiving the rectangular-area vertical width and outputting the rectangular-area vertical starting position.

3. The wipe waveform signal generating apparatus of claim 2 wherein the first calculating circuit receives the wipe width "p" and outputs the horizontal wipe width "a" and the vertical wipe width "b" which are given as:

$$a = p \cdot A$$

$$b = p \cdot B$$

where A and B denotes predetermined constants;
   wherein the first adder receives the horizontal extended width RH and the horizontal wipe width "a" and outputs the rectangular-area horizontal width SH which is given as:

$$SH = a + RH$$

wherein the second adder receives the vertical extended width RV and the vertical wipe width "b" and outputs the rectangular-area vertical width SV which is given as:

$$SV = b + RV$$

wherein the second calculating circuit receives the rectangular-area horizontal width SH and outputs the rectangular-area horizontal starting position FH which is given as:

$$FH = x - SH/2 + FH0$$

where "x" denotes a horizontal width between a left-hand edge of a screen and a center of a wipe, and FH0 denotes a horizontal width between a horizontal sync pulse and the left-hand edge of the screen; and
   wherein the third calculating circuit receives the rectangular-area vertical width SV and outputs the rectangular-area vertical starting position FV which is given as:

$$FV = y - SV/2 + FV0$$

where "y" denotes a vertical width between an upper edge of the screen and the center of the wipe and FV0 denotes a vertical width between a vertical sync pulse and the upper edge of the screen.

4. The wipe waveform signal generating apparatus of claim 1 wherein the wipe waveform calculator comprises:
   a first calculating circuit subtracting the wipe width from a predetermined constant;
   a second calculating circuit receiving the wipe width and the horizontal extended width, and outputting the rectangular-area horizontal width;
   a third calculating circuit receiving the wipe width and the vertical extended width, and outputting the rectangular-area vertical width;
   a fourth calculating circuit receiving an output from the first calculating circuit and the horizontal extended width, and outputting the rectangular-area horizontal starting position; and
   a fifth calculating circuit receiving the output from the first calculating circuit and the vertical extended width, and outputting the rectangular-area vertical starting position.

5. The wipe waveform signal generating apparatus of claim 4 wherein the first calculating circuit receives the wipe width "q" and outputs a value which is given as:

$$n - q$$

where "n" denotes the predetermined constant;
   wherein the second calculating circuit receives the wipe width "q" and the horizontal extended width RH, and outputs the rectangular-area horizontal width SH which is given as:

$$SH = (WH - RH) \cdot q/n + RH$$

where WH denotes a width of a screen;
   wherein the third calculating circuit receives the wipe width "q" and the vertical extended width RV, and outputs the rectangular-area vertical width SV which is given as:

$$SV = (WV - RV) \cdot q/n + RV$$

where WV denotes a height of the screen;

wherein the fourth calculating circuit receives the output from the first calculating circuit and the horizontal extended width RH, and outputs the rectangular-area horizontal starting position FH which is given as:

$$FH = (x - x \cdot RH/WH) \cdot (n-q)/n + FH0$$

where "x" denotes a horizontal width between a left-hand edge of the screen and a center of a wipe, and FH0 denotes a horizontal width between a horizontal sync pulse and the left-hand edge of the screen; and wherein the fifth calculating circuit receives the output from the first calculating circuit and the vertical extended width RV, and outputs the rectangular-area vertical starting position FV which is given as:

$$FV = (y - y \cdot RV/WV) \cdot (n-q)/n + FV0$$

where "y" denotes a vertical width between an upper edge of the screen and the center of the wipe, and FV0 denotes a vertical width between a vertical sync pulse and the upper edge of the screen.

6. The wipe waveform signal generating apparatus of claim 1 wherein the wipe waveform extended width holding device comprises:

a numerical value holding device holding a basic extended width; and a wipe waveform extended width calculator receiving the basic extended width and outputting the horizontal extended width and the vertical extended width.

7. The wipe waveform signal generating apparatus of claim 1 wherein the wipe waveform extended width holding device comprises:

a numerical value holding device holding a basic extended width R; and a wipe waveform extended width calculator receiving the basic extended width R and outputting the horizontal extended width RH and the vertical extended width RV;

wherein when $0 \leq R \leq WH$, the horizontal extended width RH and the vertical extended width RV are given as:

$$RH = WH - R$$

$$RV = 0$$

wherein when $WH \leq R \leq WH + WV$, the horizontal extended width RH and the vertical extended width RV are given as:

$$RH = 0$$

$$RV = R - WH$$

where WH denotes a width of a screen, and WV denotes a height of the screen.

* * * * *